US011962071B2

(12) United States Patent
Woo

(10) Patent No.: US 11,962,071 B2
(45) Date of Patent: Apr. 16, 2024

(54) ELECTRONIC DEVICE PROVIDED WITH ANTENNA

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 17/797,314

(22) PCT Filed: Feb. 4, 2020

(86) PCT No.: PCT/KR2020/001610

§ 371 (c)(1),
(2) Date: Aug. 3, 2022

(87) PCT Pub. No.: WO2021/157752

PCT Pub. Date: Aug. 12, 2021

(65) Prior Publication Data

US 2023/0059603 A1 Feb. 23, 2023

(51) Int. Cl.

| | |
|---|---|
| ***H01Q 1/24*** | (2006.01) |
| ***H01Q 1/36*** | (2006.01) |
| ***H01Q 1/48*** | (2006.01) |
| ***H01Q 21/24*** | (2006.01) |

(52) U.S. Cl.

CPC ............... *H01Q 1/243* (2013.01); *H01Q 1/36* (2013.01); *H01Q 1/48* (2013.01); *H01Q 21/24* (2013.01)

(58) Field of Classification Search

CPC .. H01Q 1/243; H01Q 1/38–48; H01Q 21/065; H01Q 21/24; H01Q 5/30–35

See application file for complete search history.

(56) References Cited

U.S. PATENT DOCUMENTS

| | | | | |
|---|---|---|---|---|
| 10,826,177 | B2 * | 11/2020 | Mow | H01Q 1/243 |
| 11,108,155 | B2 * | 8/2021 | Gomez Angulo | H04B 1/18 |
| 2009/0207092 | A1 | 8/2009 | Nysen et al. | |

FOREIGN PATENT DOCUMENTS

| | | |
|---|---|---|
| JP | 2019-080298 | 5/2019 |
| KR | 10-2019-0060283 | 6/2019 |
| KR | 10-2020-0008716 | 1/2020 |
| WO | 2019165193 | 8/2019 |

OTHER PUBLICATIONS

PCT International Application No. PCT/KR2020/001610, International Search Report dated Oct. 26, 2020, 5 pages.

* cited by examiner

*Primary Examiner* — Hasan Islam
(74) *Attorney, Agent, or Firm* — LEE, HONG, DEGERMAN, KANG & WAIMEY

(57) ABSTRACT

An electronic device provided with an antenna is provided according to one embodiment. The electronic device comprises: a first radiator disposed inside a first substrate, and radiating a first signal, having a first polarization, in the direction of the side surface of the first substrate; a second radiator disposed on a second substrate which is disposed perpendicular to the first substrate, and radiating a second signal, having a second polarization perpendicular to the first polarization, in the direction of the side surface of the first substrate; and a transceiver circuit disposed on the rear of the first substrate, and transmitting or receiving at least one of the first signal and the second signal through at least one of the first radiator and the second radiator.

13 Claims, 20 Drawing Sheets

(a)

(b)

| | Frequency | Polarization | Gain | Comparison with conventional patch antenna |
|---|---|---|---|---|
| Dipole array (Array 1) | 28GHz | Horizontal Pol(HP) | 11.5dBi | 9.0dBi |
| | 38.5GHz | Horizontal Pol(HP) | 10.1dBi | 10.0dBi |
| Monopole array (Array 2) | 28GHz | Vertical Pol(VP) | 9.0dBi | - |
| | 38.5GHz | Vertical Pol(VP) | 8.0dBi | - |

ELECTRONIC DEVICE PROVIDED WITH ANTENNA

CROSS-REFERENCE TO RELATED APPLICATIONS

This application is the National Stage filing under 35 U.S.C. 371 of International Application No. PCT/KR2020/001610, filed on Feb. 4, 2020, the contents of which are hereby incorporated by reference herein its entirety.

TECHNICAL FIELD

The present disclosure relates to an electronic device having antennas. One particular implementation relates to an antenna module having an array antenna that operates in a millimeter wave band.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services in such mmWave bands. In this regard, a plurality of array antennas may be disposed in an electronic device in the mmWave bands.

In this regard, a plurality of antennas capable of operating in a millimeter wave (mmWave) band need to operate in a wide frequency band to cover one or more bands. However, it may be difficult to implement the antennas to operate as dual polarization antennas while disposing the antennas in an electronic device with a narrow space for broadband operation.

DISCLOSURE OF INVENTION

Technical Problem

The present disclosure is directed to solving the aforementioned problems and other drawbacks. Another aspect of the present disclosure is to provide an electronic device comprising an antenna module with a plurality of antennas operating in a millimeter-wave band and a configuration for controlling the same.

Still another aspect of the present disclosure is to provide a configuration for disposing a package module in an electronic device, the package module including a millimeter wave band antenna module and a circuit, without increasing the size and mounting space of the package module.

A further aspect of the present disclosure is to provide side radiation using dipole/monopole antennas, in order to increase the coverage of a mmWave antenna.

A further aspect of the present disclosure is to implement dual polarization while using dipole/monopole antennas for wideband operation in a mmWave band.

A further aspect of the present disclosure is to implement dual polarization in an antenna, without increasing parts costs, only by using peripherals of an antenna module disposed in an electronic device.

Technical Solution

To achieve these and other advantages and in accordance with the purpose of the present disclosure, as embodied and broadly described herein, there is provided an electronic device provided with an antenna. The electronic device comprises: a first radiator disposed inside a first substrate, and radiating a first signal, having a first polarization, in the direction of the side surface of the first substrate; a second radiator disposed on a second substrate which is disposed perpendicular to the first substrate, and radiating a second signal, having a second polarization perpendicular to the first polarization, in the direction of the side surface of the first substrate; and a transceiver circuit disposed on the rear of the first substrate, and transmitting or receiving at least one of the first signal and the second signal through at least one of the first radiator and the second radiator.

In an embodiment, the first radiator may include a dipole antenna, and the second radiator includes a monopole antenna. The electronic device may further comprise a baseband processor operatively coupled to the transceiver circuit and configured to control the transceiver circuit.

In an embodiment, the first substrate may include a multi-layer substrate, and the dipole antenna may be formed by printing a metal pattern on one layer inside the first substrate corresponding to the multi-layer substrate. The monopole antenna may be formed by printing a metal pattern on the second substrate.

In an embodiment, the electronic device may further comprise a third radiator disposed on the front of the third substrate disposed on the rear of the first substrate, and configured to radiate a third signal in the direction of the front of the third substrate. The third radiator may include a patch antenna.

In an embodiment, the transceiver circuit may include a radio frequency integrated circuit (RFIC), the RFIC being surrounded by a dielectric package. An antenna module including the third substrate and the dielectric package may be spaced apart from a main printed circuit board (PCB) corresponding to the second substrate by a predetermined gap.

In an embodiment, the monopole antenna may include: a radiation portion formed in a metal pattern having a predetermined width and length; and a first matching portion connected to the radiation portion and formed in a metal pattern on an end of the second substrate.

In an embodiment, the monopole antenna may further include: a second matching portion formed in a metal pattern on an end of a side surface of the dielectric package attached to the first substrate; and a feeding portion connected to the second matching portion and configured to apply a signal to the radiation portion through the first matching portion and the second matching portion. The first matching portion and the second matching portion may be spaced apart from each other by a predetermined gap between the dielectric package and the second substrate.

In an embodiment, for the dipole antenna, a plurality of dipole antenna elements spaced at predetermined intervals may be formed as a first array antenna, and, for the monopole antenna, a plurality of monopole antenna elements spaced at predetermined intervals may be formed as a second array antenna.

In an embodiment, the baseband processor may control the transceiver circuit so as to radiate a horizontal polarization signal through the first array antenna and to radiate a vertical polarization signal through the second array antenna.

In an embodiment, the dipole antenna may be disposed perpendicular to the monopole antenna disposed on the second substrate, and may be formed in such a way as to increase gain by using a ground pattern, which is formed on a side surface of the third substrate and a side surface of the dielectric package, as a reflector.

In an embodiment, the monopole antenna may be formed by printing a metal pattern on the second substrate. A ground may be formed on the bottom of the second substrate, and the second substrate and the dielectric package may be attached and fixed to a metal structure whose surface is made of metal.

In an embodiment, the patch antenna may be formed to be surrounded by a cavity which is formed to surround the bottom and side of the third substrate. For the patch antenna, a plurality of antenna elements may be formed as a third array antenna so as to operate as an antenna in a mmWave band.

In an embodiment, the baseband processor performs MIMO by radiating a horizontal polarization signal through the first array antenna and radiating a vertical polarization signal through the second array antenna. The baseband processor may determine whether the quality of a first signal corresponding to the horizontal polarization signal and the quality of a second signal corresponding to the vertical polarization signal are lower than or equal to a threshold. If the quality of the second signal is lower than or equal to the threshold, the baseband processor may control the transceiver circuit so as to radiate a third signal through the third array antenna in the direction of the front of the third substrate.

In an embodiment, the baseband processor may determine whether the quality of the first signal, which is a beamformed horizontal polarization signal received through the first array antenna, is lower than or equal to a threshold. If the quality of the first signal is lower than or equal to the threshold, the baseband processor may receive the second signal, which is a vertical polarization signal, by performing beamforming through the second array antenna.

In an embodiment, in a first band, the baseband processor may control to radiate the first signal, which is a horizontal polarization signal, through the first array antenna and to radiate the second signal, which is a vertical polarization signal, through the second array antenna. If the quality of the first signal and the quality of the second signal are lower than or equal to a threshold, the baseband processor may send the base station a request for resources of the second band which is a higher frequency band than the first band. In a second band, the baseband processor may control to radiate a horizontal polarization signal through the first array antenna and to radiate a vertical polarization signal through the second array antenna.

In accordance with another aspect of the present disclosure, there is provided an antenna module provided in an electronic device, the antenna module comprising: a monopole antenna disposed inside a first substrate, and radiating a first signal, having a first polarization, in the direction of the side surface of the first substrate; a dipole antenna disposed on a second substrate which is disposed perpendicular to the first substrate, and radiating a second signal, having a second polarization perpendicular to the first polarization, in the direction of the side surface of the first substrate.

In an embodiment, the antenna module may further comprise a dielectric package disposed on the rear of the first substrate, and formed to surround an RFIC operatively coupled to the monopole antenna and the dipole antenna.

Advantageous Effects of Invention

Technical advantages of an antenna module provided with a plurality of antennas operating in a millimeter-wave band and an electronic device for controlling the same will be described as follows.

According to an embodiment, there is provided an electronic device comprising an antenna module with a plurality of antennas operating in a millimeter-wave band and a configuration for controlling the same.

According to an embodiment, it is possible to dispose a package module in an electronic device, the package module including a millimeter wave band antenna module and a circuit, without increasing the size and mounting space of the package module.

According to an embodiment, it is possible to provide side radiation using dipole/monopole antennas implemented on substrates that are disposed perpendicular to each other, in order to increase the coverage of a mmWave antenna.

According to an embodiment, it is possible to support multiple input multiple output (MIMO) by implementing dual polarization while using dipole/monopole antennas for wideband operation in a mmWave band.

According to an embodiment, it is possible to support multiple input multiple output (MIMO) by implementing dual polarization while using dipole/monopole antennas for wideband operation in a mmWave band.

According to an embodiment, it is possible to provide a new, optimal feeding scheme that allows for separation while implementing dual polarization in a mmWave band.

According to an embodiment, it is possible to improve isolation when implementing dual polarization, by a new optimal feeding scheme that allows for separation while implementing dual polarization in a mmWave band.

According to an embodiment, it is possible to improve performance in a multiple input multiple output (MIMO) operation by improving isolation when implementing dual polarization.

According to an embodiment, it is possible to implement dual polarization in an antenna, without increasing parts costs, only by using peripherals of an antenna module disposed in an electronic device.

Further scope of applicability of the present disclosure will become apparent from the following detailed description. It should be understood, however, that the detailed description and specific examples, such as the preferred implementation of the disclosure, are given by way of illustration only, since various changes and modifications within the spirit and scope of the disclosure will be apparent to those skilled in the art.

MODE FOR THE INVENTION

Figure 1:
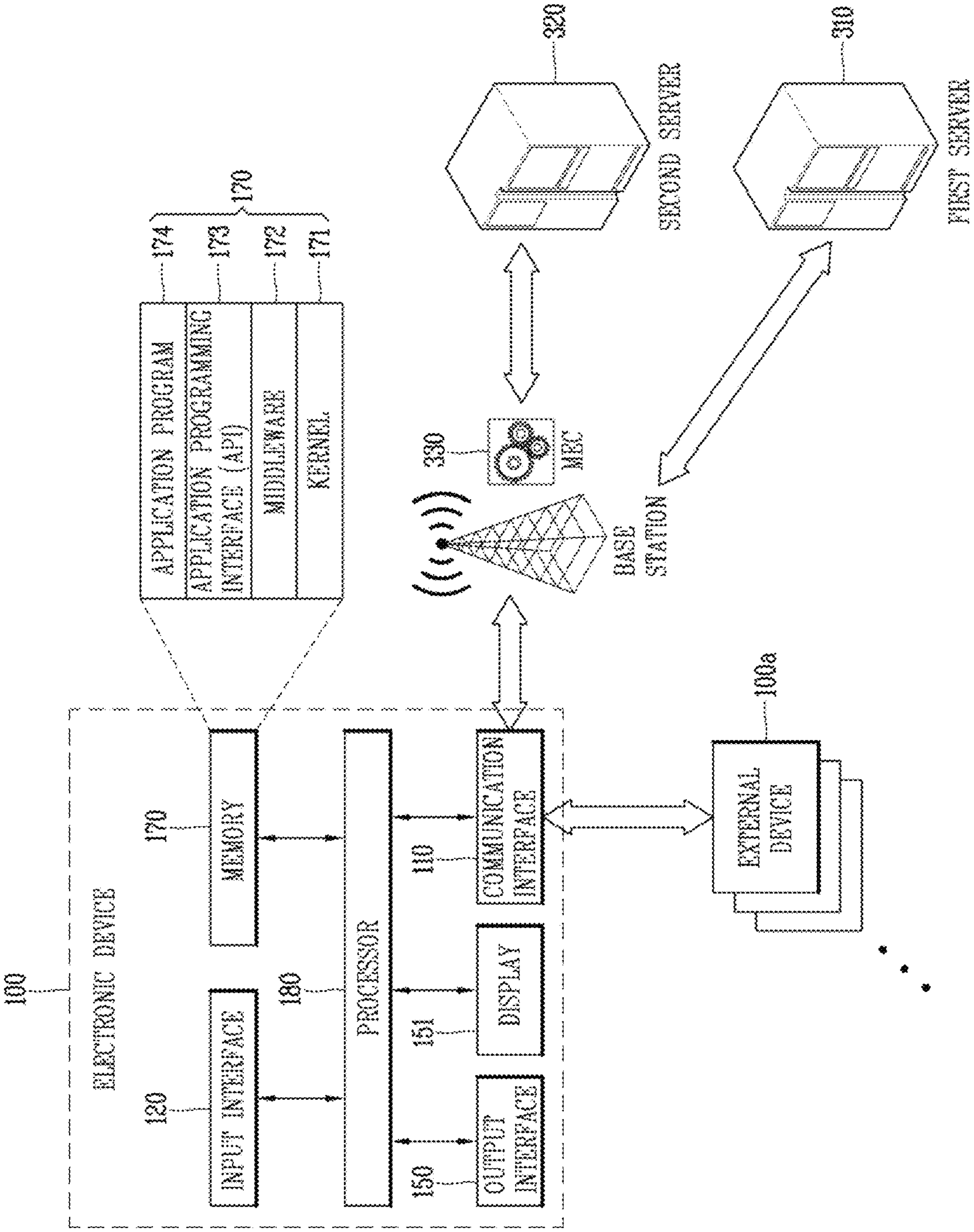
FIG. 1 is a view illustrating a configuration for describing an electronic device in accordance with one embodiment, and an interface between the electronic device and an external device or server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
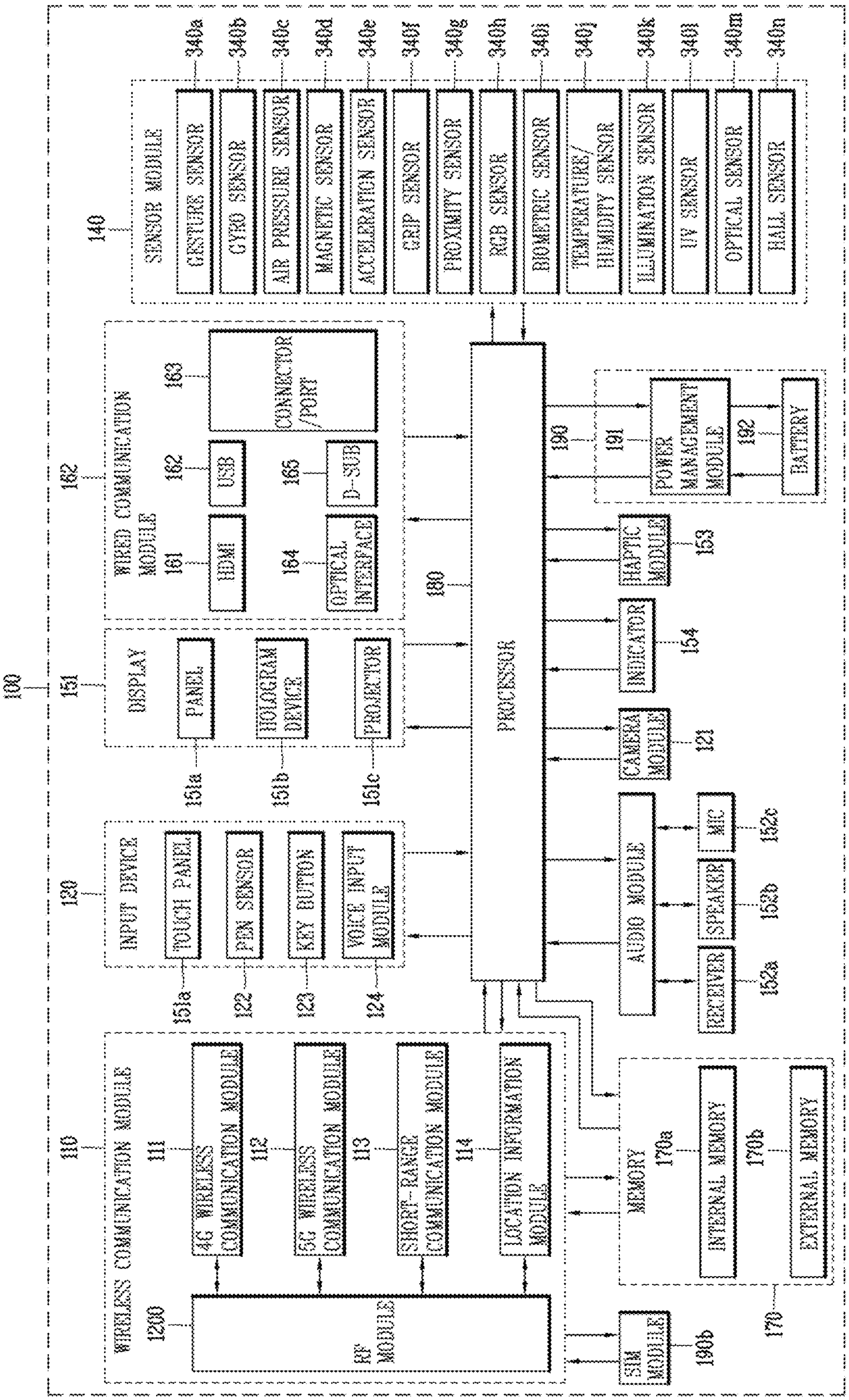
FIG. 2A is a view illustrating a detailed configuration of the electronic device of FIG. 1.
Figure 2B:
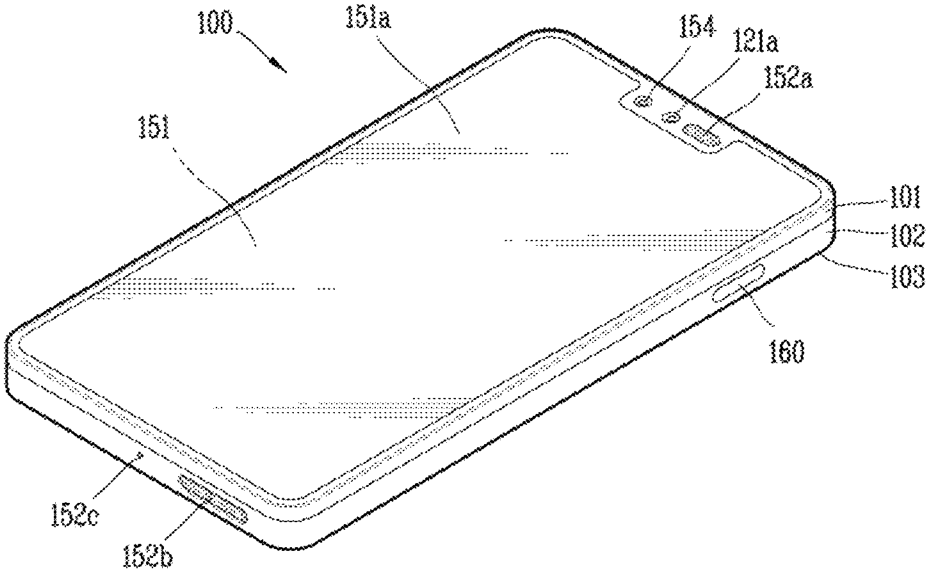
FIGS. 2B and 2C are conceptual views illustrating one example of an electronic device according to the present disclosure, viewed from different directions.
Figure 2C:
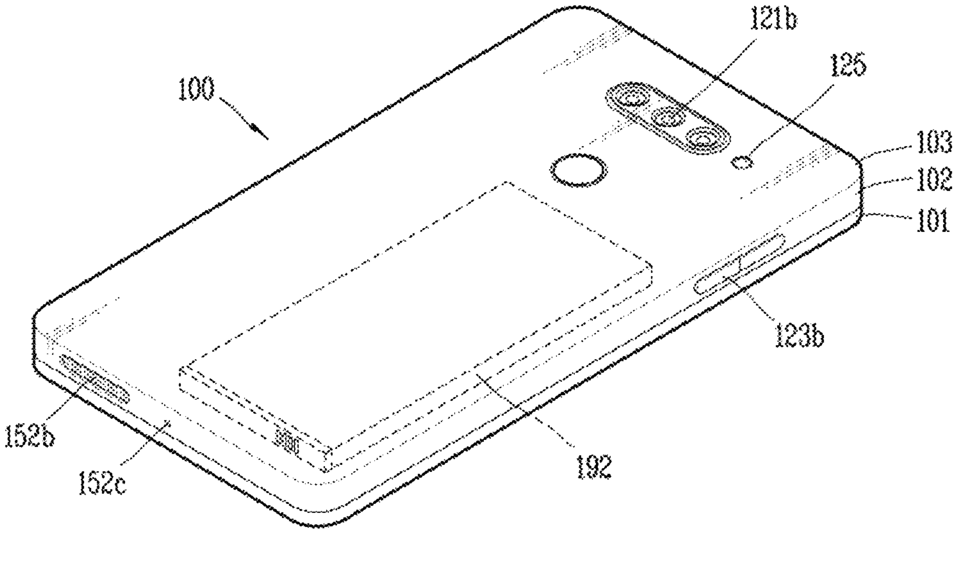

FIG. 1 is a view illustrating a configuration for describing an electronic device in accordance with one embodiment, and an interface between the electronic device and an external device or server. Meanwhile, referring to FIGS. 2A to 2B, FIG. 2A is a view illustrating a detailed configuration of the electronic device of FIG. 1. FIGS. 2B and 2C are conceptual views illustrating one example of an electronic device according to the present disclosure, viewed from different directions.

Referring to FIG. 1, the electronic device 100 may include a communication interface 110, an input interface (or an input device) 120, an output interface (or an output device) 150, and a processor 180. Here, the communication interface 110 may refer to a wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF band and a baseband processor. Meanwhile, an RF module 1200 may be implemented as an RF transceiver circuit operating in an RF frequency band of each communication system. However, the present disclosure may not be limited thereto, but may be interpreted that each of the 4G wireless communication module 111, the 5G wireless communication module 112, the short-range communication module 113, and the location information module 114 includes an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of “Evolved Universal Telecommunication Radio Access Network”, and refers to a 4G wireless communication system. Also, NR is an abbreviated form of “New Radio” and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151*a*, and the like. On the other hand, the input device 120 may include a camera module 121 for inputting an image signal, a microphone 152*c* or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g., RGB (red, green, blue) sensor), a bio-sensor 340*i*, a temperature/humidity sensor 340*j*, an illuminance sensor 340*k*, an ultra violet (UV) sensor 340*l*, a light sensor 340*m*, and a hall sensor 340*n*. The sensor module 140 may also include at least one of a finger scan sensor, an ultrasonic sensor, an optical sensor (for example, camera 121), a microphone (see 152*c*), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output device 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical systems (MEMS) display, or an electronic paper display. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151*a*, a hologram device 151*b*, a projector 151*c*, and/or a control circuit for controlling them. In this regard, the panel may be implemented to be flexible, transparent, or wearable. The panel may include the touch panel 151*a* and one or more modules. The hologram device 151*b* may display a stereoscopic image in the air by using light interference. The projector 151*c* may display an image by projecting light onto a screen. The screen may be located inside or outside the electronic device 100, for example.

The audio module 152 may interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory **170*a* and an external memory 170*b*. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174** may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device **100*a*, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100*a*, the first server 310 and the second server 320. According to an implementation, when the electronic device 100 should perform a specific function or service automatically or at a request, the electronic device 100 may request another device (e.g., the external device 100***a*, the first server 310, and the second server 320) to perform at least some functions associated therewith, instead of executing the function or service on its own or additionally. The another electronic device (e.g., the external device 100*a*, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100*a*, a first server 310, and a second server 320. The electronic device 100 may be functionally connected to at least one external device 100*a*, and may control contents or functions of the electronic device 100 based on information received from the at least one external device 100*a*. According to an implementation, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an implementation, the electronic device 100 may be connected to at least one external device 100*a* through a wired or wireless communication interface to receive or transmit information. For example, the electronic device 100 and the at least one external device 100*a* include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100*a* which is an assistant device linked with the electronic device 100, may be a device designed for various purposes, such as convenience of use, more attractive appearance, enhancement of usability, etc. of the electronic device 100. At least one external device 100*a* may or may not be in physical contact with the electronic device 100. According to one implementation, the at least one external device 100*a* may be functionally connected to the electronic device 100 using a wired/wireless communication module to control information for controlling content or a function in the electronic device 100.

Meanwhile, the first server 310 may include a server or a cloud device for services related to the at least one external device 100*a* or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Referring to FIGS. 2B and 2C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100, referring to FIGS. 2A to 2C, may include a display 151, first and second audio output modules 152*a*, 152*b*, a proximity sensor 141, an illumination sensor 152, an optical output module 154, first and second cameras 121*a*, 121*b*, first and second manipulation units 123*a*, 123*b*, a microphone 152*c*, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a processor 180 may generate a control command corresponding to the touch. Contents input in the touch manner may be characters, numbers, instructions in various modes, or a menu item that can be specified.

Figure 3A:
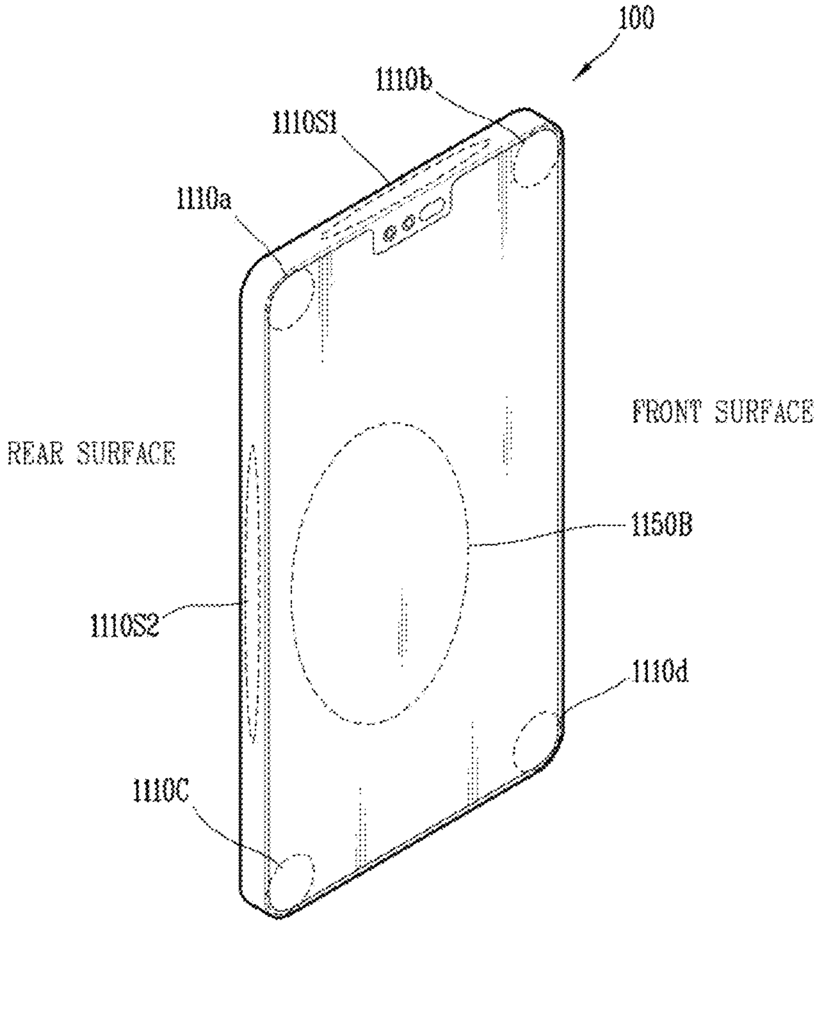
FIG. 3A illustrates an exemplary configuration in which a plurality of antennas of the electronic device can be arranged.

In this way, the display 151 may form a touch screen together with the touch sensor, and in this case, the touch screen may function as the user input unit (123, see FIG. 3A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the processor 180 may control the optical output module 154 to stop the light output.

The first camera 121*a* may process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*. The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained. The flash 125 may be disposed adjacent to the second camera 121*b*. When an image of a subject is captured with the camera 121*b*, the flash 125 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication. The microphone 152*c* may be configured to receive the user's voice, other sounds, and the like. The microphone 152*c* may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 for supplying power to the electronic device 100. The power supply unit 190 may include a batter 191 which is mounted in the terminal body or detachably coupled to an outside of the terminal body.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be a mmWave band but is not limited thereto, and may be changed depending on applications.

FIG. 3A illustrates an exemplary configuration in which a plurality of antennas of the electronic device can be arranged. Referring to FIG. 3, a plurality of antennas 1110*a* to 1110*d* may be arranged in the electronic device 100 or on a front surface of the electronic device 100. In this regard, the plurality of antennas 1110*a* to 1110*d* may be implemented in a form printed on a carrier inside the electronic device or may be implemented in a form of system-on-chip (Soc) together with an RFIC. The plurality of antennas 1110*a* to 1110*d* may be disposed on the front surface of the electronic device in addition to the inside of the electronic device. Here, the plurality of antennas 1110*a* to 1110*d* disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110*a* to 1110*d* can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110*a* to 1110*d*, 1150B, 1110S1, and 1110S2 on the front surface and/or the side surfaces of the electronic device 100. The electronic device may perform communication with a base station through any one of the plurality of antennas 1110*a* to 1110*d*, 1150B, 1110S1, and 1110S2. Alternatively, the electronic device may perform MIMO communication with a base station through two or more antennas among the plurality of antennas 1110*a* to 1110*d*, 1150B, 1110S1, 1110S2.

Figure 3B:
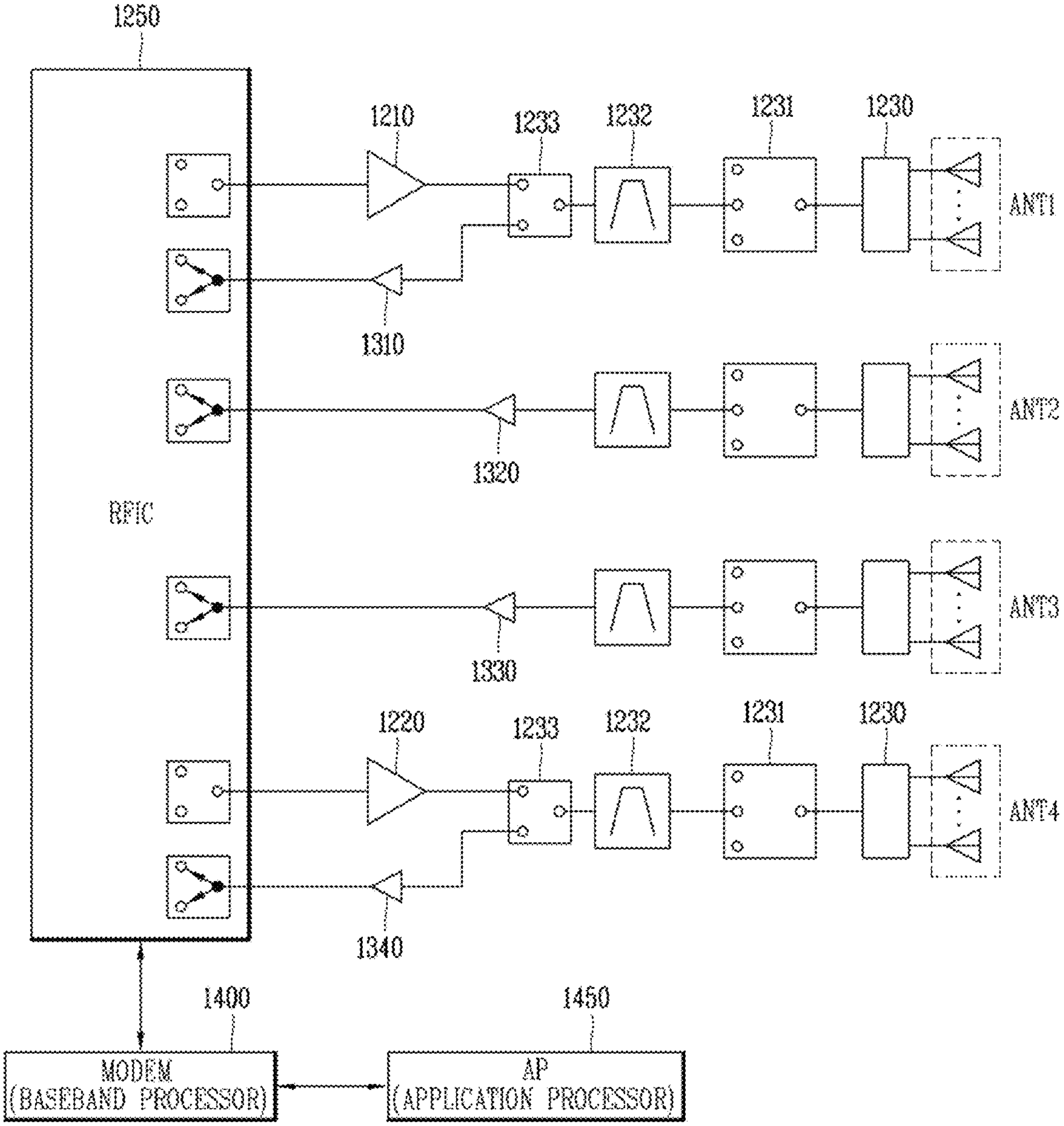
FIG. 3B is a diagram illustrating a configuration of a wireless communication module of an electronic device operable in a plurality of wireless communication systems according to an implementation.

FIG. 3B is a diagram illustrating a configuration of a wireless communication module of an electronic device operable in a plurality of wireless communication systems according to an implementation. Referring to FIG. 3B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in a 4G band or a Sub 6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an implementation may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 230 may control the phase of the signal applied to each antenna element so that each of the array antennas ANT1 to ANT4 can form beams in different directions.

The duplexer 1231 may be configured to separate a signal in a transmission band and a signal in a reception band from each other. In this case, the signal in the transmission band transmitted through the first and second power amplifiers 1210 and 1220 may be applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass a signal in a transmission band or a reception band and to block a signal in a remaining band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, since the transmission signal and the reception signal can be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

On the other hand, in the electronic device illustrated in FIGS. 1 to 2B, the specific configuration and function of the electronic device including the antennas disposed inside the electronic device as illustrated in FIG. 3A and the multi-transceiving system as illustrated in FIG. 3B will be described below.

In this regard, the electronic device, for example, a mobile terminal may provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 38.5 GHz band, and a 64 GHz band are being considered as frequency bands to be allocated for 5G communication services and Wi-Fi (IEEE 802.11) communication services in such mmWave band. In this regard, a plurality of array antennas may be disposed in an electronic device in the mmWave bands.

In this regard, a plurality of antennas capable of operating in a millimeter wave (mmWave) band need to operate in a wide frequency band to cover one or more bands. However, it may be difficult to implement the antennas to operate as dual polarization antennas while disposing the antennas in an electronic device with a narrow space for broadband operation.

The present disclosure is directed to solving the aforementioned problems and other drawbacks. Another aspect of the present disclosure is to provide an electronic device comprising an antenna module provided with a plurality of antennas operating in a millimeter-wave band and a configuration for controlling the same.

Still another aspect of the present disclosure is to provide a configuration for disposing a package module in an electronic device, the package module including a millimeter wave band antenna module and a circuit, without increasing the size and mounting space of the package module.

A further aspect of the present disclosure is to provide side radiation using dipole/monopole antennas, in order to increase the coverage of a mmWave antenna.

A further aspect of the present disclosure is to implement dual polarization while using dipole/monopole antennas for wideband operation in a mmWave band.

A further aspect of the present disclosure is to implement dual polarization in an antenna, without increasing parts costs, only by using peripherals of an antenna module disposed in an electronic device.

To accomplish these aspects, an antenna module proposed in this specification may use a peripheral structure such as a metal frame for an electronic device in order to implement dual polarization. Also, one of the antennas within the antenna module may feed a radiator having a separated structure through coupling by using a T-coupling structure. Accordingly, it is possible to effectively feed one antenna formed on a different substrate, spaced apart from others. Consequently, different antennas formed on different substrates may be interfaced on a transceiver circuit, that is, an RFIC, while maintaining low loss characteristics.

Figure 4A:
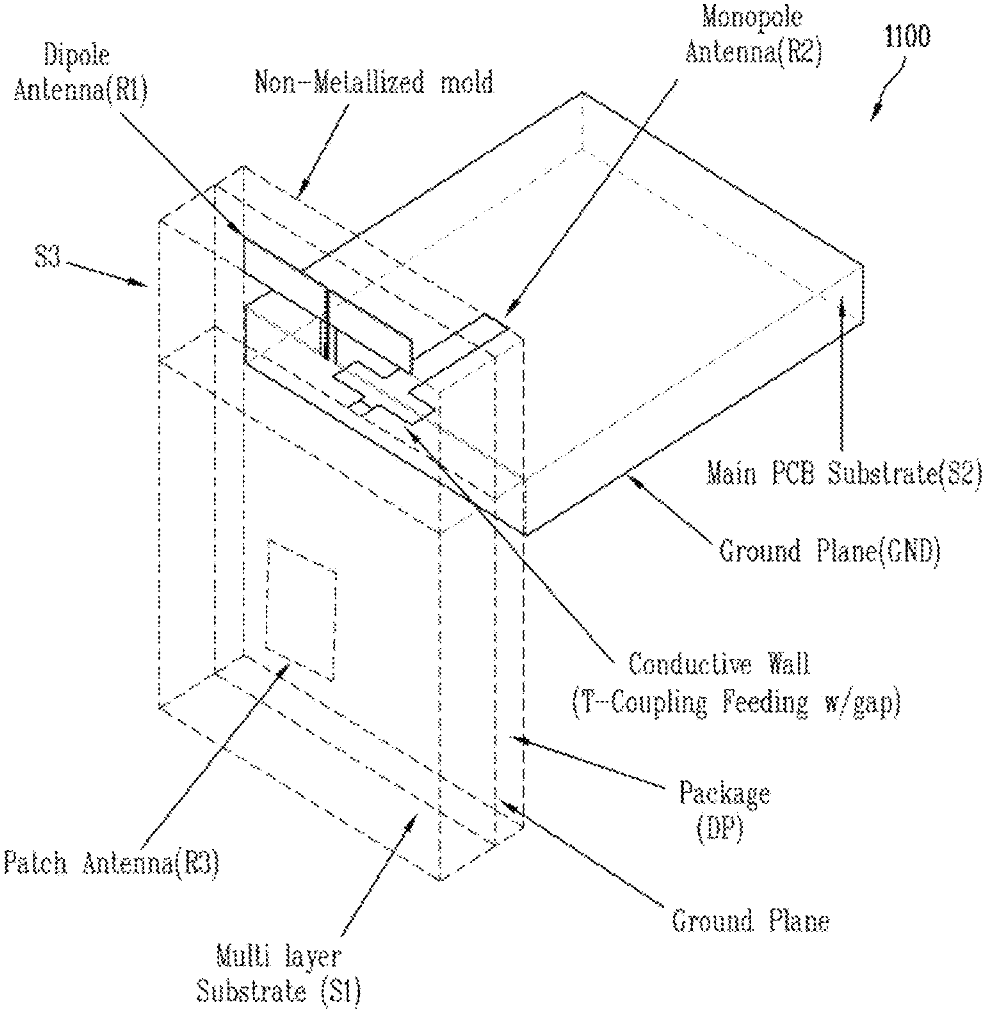
FIG. 4A shows a perspective view of an antenna module with a plurality of antennas according to an embodiment. Meanwhile.

In this regard, FIG. 4A shows a perspective view of an antenna module with a plurality of antennas according to an embodiment. Meanwhile, FIG. 4B shows a side view of the antenna module of FIG. 4A.

Figure 4B:
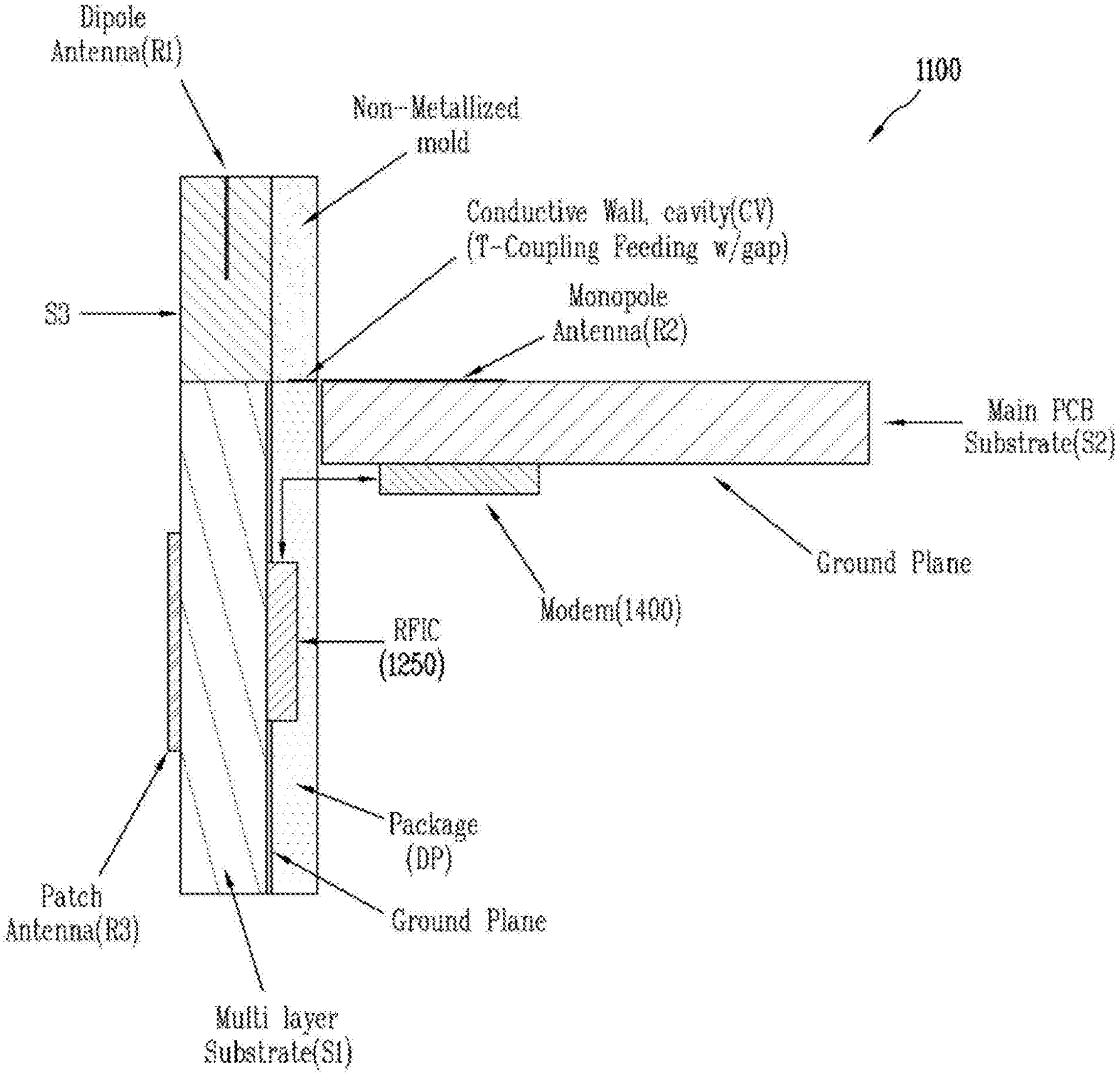
FIG. 4B shows a side view of the antenna module of FIG. 4A.

Referring to FIG. 4A and FIG. 4B, the electronic device may include an antenna module 1100, a transceiver circuit 1250, and a processor 1400. In this regard, the antenna module 1100 may include a plurality of antennas and the transceiver circuit 1250.

The antenna module 1100 may include a plurality of substrates S1 to S3. According to an embodiment, the antenna module 1100 may include a first substrate S1 and a second substrate S2. In this regard, the first substrate S1 may include a multi-layer substrate. The second substrate S2 may be spaced apart from the first substrate S1 by a dielectric package DP and a predetermined gap.

Multiple electronic parts including the processor 1400 may be disposed on the second substrate S2 which corresponds to a main PCB. The processor 1400 may be a baseband processor 1450 corresponding to a modem. The processor 1400 may be disposed on the front or rear of the second substrate S2. According to another embodiment, the baseband processor 1400 may be configured integrally with the transceiver circuit 1250. The baseband processor 1400 may be implemented as a system on chip (SoC) with the transceiver circuit 1250 corresponding to an RFIC.

The antenna module 1100 may include a first substrate S1, a second substrate S2, and a third substrate S3. The antenna module 1100 may include a plurality of radiators R1 to R3 disposed on the substrates S1 to S3. According to an embodiment, the antenna module 1100 may include first to third radiators R1 to R3.

The first radiator R1 may be disposed inside the first substrate S1 and configured to radiate a first signal having a first polarization in the direction of a side surface of the first substrate S1. The second radiator R2 may be disposed on the second substrate S2 which is disposed perpendicular to the first substrate S1. The second radiator R2 may be configured to radiate a second signal having a second polarization perpendicular to the first polarization, in the direction of the side surface of the first substrate S1. Meanwhile, the third radiator R3 may be disposed on the front of the third substrate S3 disposed on the rear of the first substrate S1. The third radiator R3 may be configured to radiate a third signal in the direction of the front of the third substrate S3. The third radiator R3 may include a patch antenna.

Meanwhile, the patch antenna corresponding to the third radiator R3 may operate as an antenna having a first polarization and a second polarization through dual feeding. For example, the patch antenna corresponding to the third radiator R3 may operate as a vertical polarized antenna and a horizontal antenna. Accordingly, signals having polarizations orthogonal to each other may be simultaneously transmitted and/or received in the direction of the side surface of the first substrate S1 through the first radiator R1 and the second radiator R2. Also, signals having polarizations orthogonal to each other may be simultaneously transmitted and/or received in the direction of the side surface of the first substrate S1 through a dual feeding structure of the patch antenna corresponding to the third radiator R3. Consequently, dual polarization may be implemented through at least one antenna within the antenna module 1100 through different antennas in any direction.

As described above, a configuration of an antenna module with a plurality of antennas and operational characteristics of the plurality of antennas are as follows. In this regard, the first radiator R1 and the second radiator R2 may be, but not limited to, a monopole antenna and a dipole antenna.

1) A mmWave antenna module includes a dipole antenna, a non-metallized mold, a conductive wall, an RFIC, a patch antenna, a multi-layer substrate, a ground plane, and a package.

2) The main PCB includes a monopole antenna and a ground plane.

3) The mmWave antenna module radiates to both the front and side. The patch antenna radiates an electric wave to the front, and the dipole antenna radiates an electric wave to the side.

4) A radiator of the patch antenna is fabricated of copper on the multi-layer substrate, and is surrounded in the shape of a cavity on the ground plane.

5) The dipole antenna is positioned on a side surface of the multi-layer substrate, and increases antenna gain by using the ground plane as a reflector.

6) The monopole antenna has a radiator on the main PCB and is fabricated of copper on a substrate of the main PCB, and its gain increases when radiating in the direction of the side surface, due to the main PCB ground.

7) The main PCB and the mmWave antenna module are spaced apart from each other by a gap of 0.05 to 0.1 mm.

8) The RFIC positioned on the rear of the patch antenna is enclosed in a package, has a conductive wall present on the package, and has a T-shape. The RFIC is connected to a mmWave signal feed line, and feeds the monopole antenna positioned over the main PCB by coupling.

9) The dipole antenna generates a horizontal polarization.

10) The monopole antenna generates a vertical polarization.

Figure 5A:
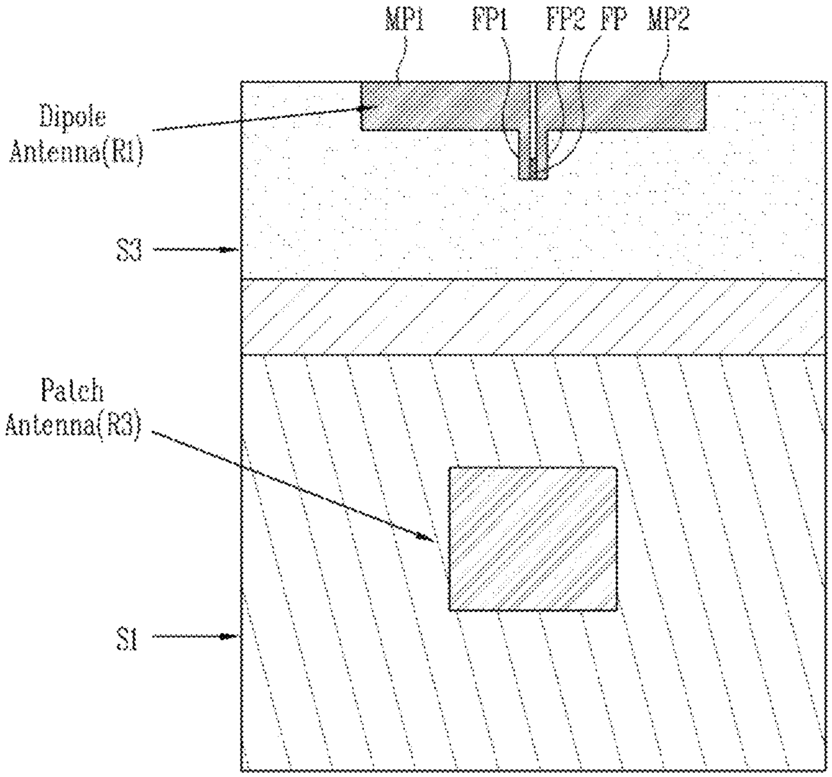
FIG. 5A shows an antenna module when viewed in the direction in which a dipole antenna and a patch antenna are disposed.
Figure 5B:
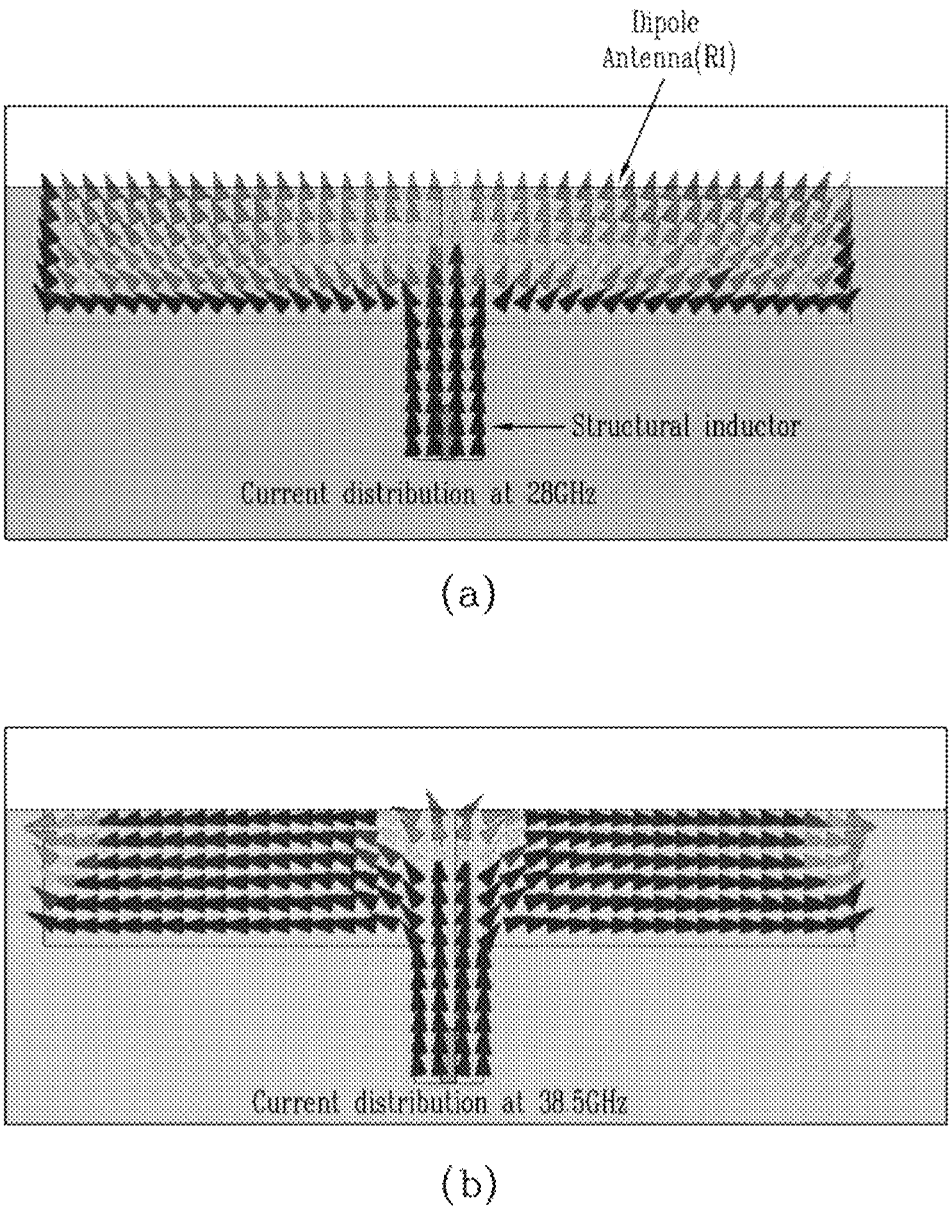
FIG. 5B and FIG. 5C are smith charts showing how the impedance of the dipole antenna changes with the current distribution and frequency change on the dipole antenna operating in different bands.
Figure 5C:
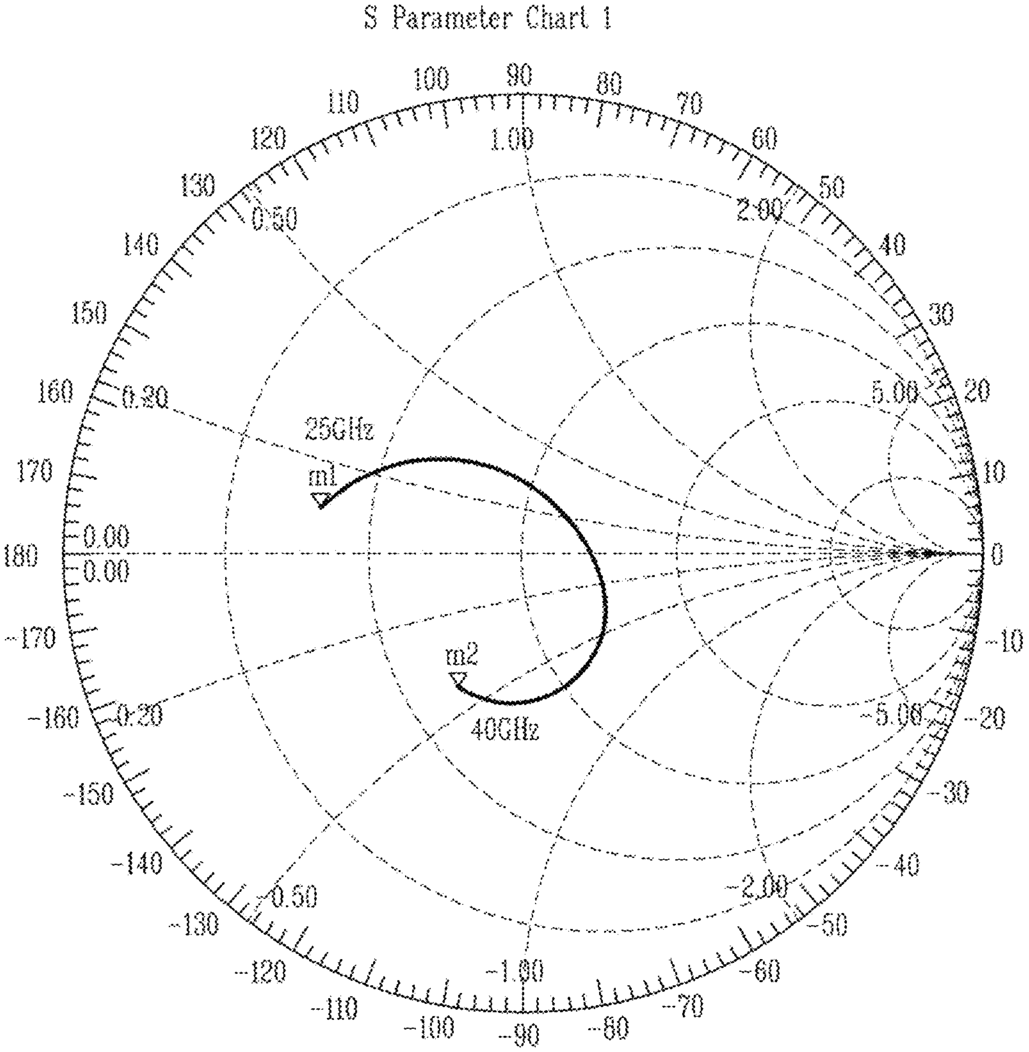

The configuration and operation of the first to third radiators R1 to R3 will be described in detail. In this regard, FIG. 5A shows an antenna module when viewed in the direction in which a dipole antenna and a patch antenna are disposed. FIG. 5B and FIG. 5C are smith charts showing how the impedance of the dipole antenna changes with the current distribution and frequency change on the dipole antenna operating in different bands.

Figure 6A:
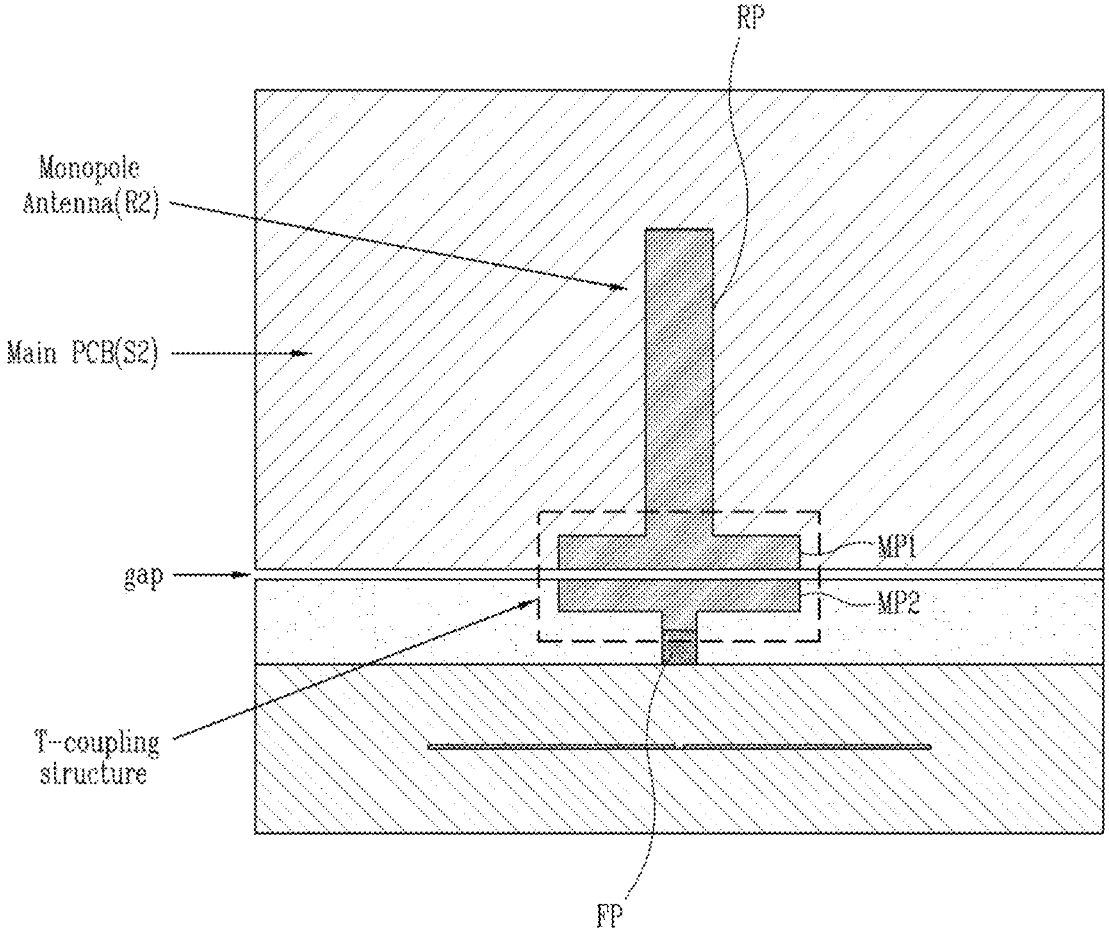
FIG. 6A shows an antenna module when viewed in the direction in which the monopole antenna is disposed.
Figure 6B:
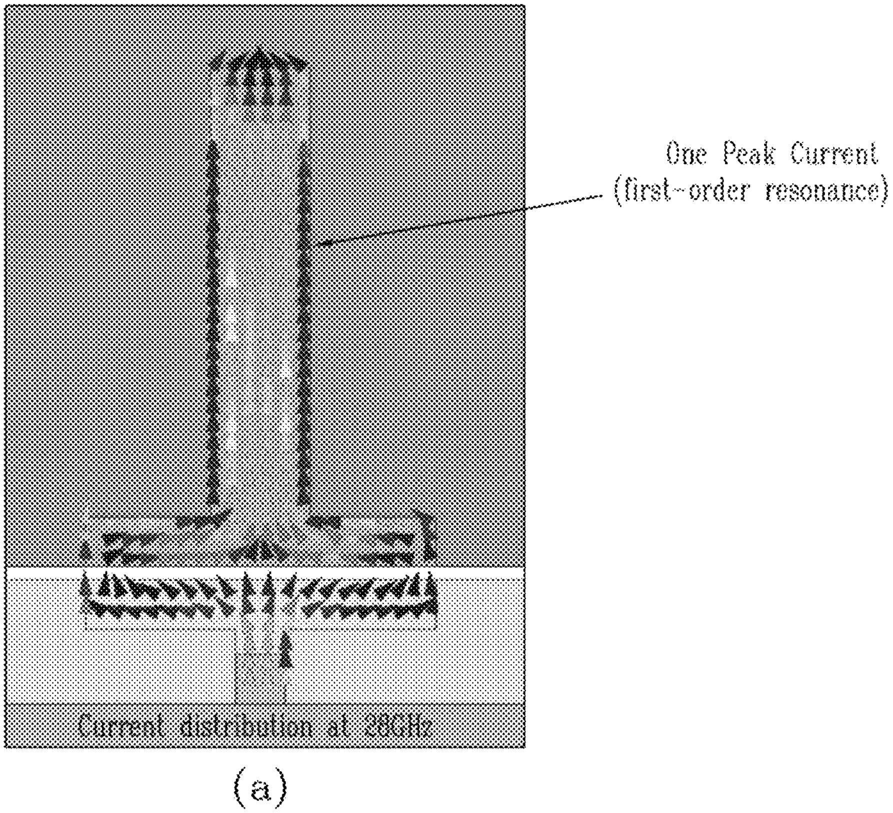
FIG. 6B shows the current distribution and frequency change on the monopole antenna operating in different bands and how the impedance of the pole antenna.
Figure 6B:
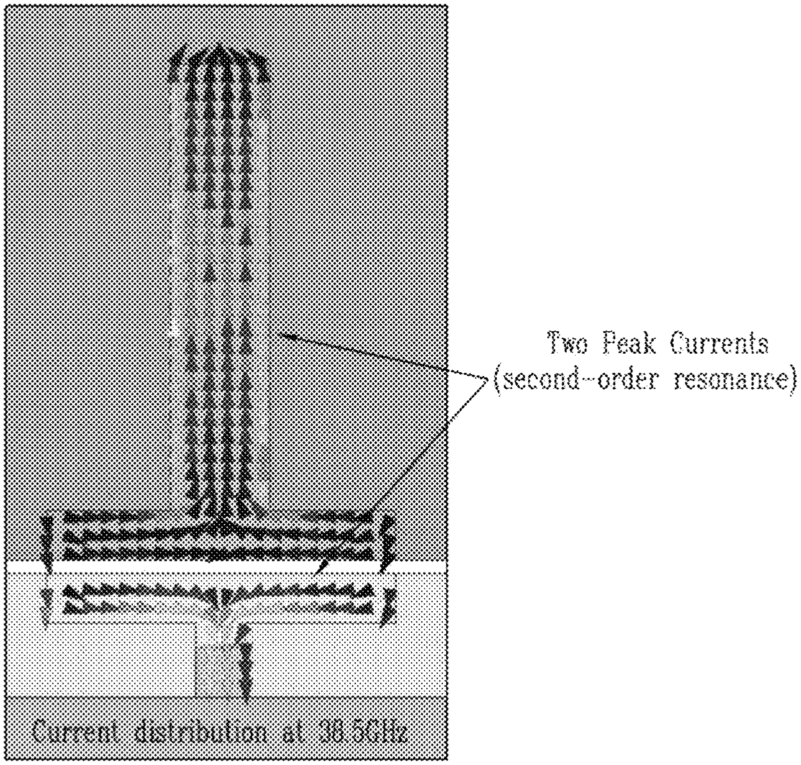

Meanwhile, FIG. 6A shows an antenna module when viewed in the direction in which the monopole antenna is disposed. FIG. 6B shows the current distribution and frequency change on the monopole antenna operating in different bands.

Referring to FIGS. 4A to 6B, the first radiator R1 may include a dipole antenna, and the second radiator R2 may include a monopole antenna. The transceiver circuit 1250 may be disposed on the rear of the first substrate S1. In this regard, the third radiator R3 corresponding to the patch antenna may be disposed on the top (or front) of the first substrate S1, and a dielectric package (DP) including the transceiver circuit 1250 may be disposed on the bottom (or rear) of the third substrate S3. Meanwhile, a non-mental mold may be formed and disposed on the bottom (or rear) of the third substrate S3.

The transceiver circuit 1250 may be configured to transmit or receive at least one of first and second signals through at least one of the first and second radiators S1 and S2. The transceiver circuit 1250 may include an RFIC, and the RFIC may be surrounded by a dielectric package DP. The antenna module 1100 including the third substrate S3 and the dielectric package DP may be spaced apart from the main PCB corresponding to the second substrate S2 by a predetermined gap. Meanwhile, the baseband processor 1400 may be operatively coupled to the transceiver circuit 1250, and may be configured to control the transceiver circuit 1250.

Specifically, the first substrate S1 may include a multi-layer substrate, and the dipole antenna corresponding to the first radiator R1 may be formed by printing a metal pattern on one layer inside the first substrate S1 corresponding to the multi-layer substrate. Meanwhile, the dipole antenna may be disposed perpendicular to the monopole antenna disposed on the second substrate S2. The dipole antenna may be formed in such a way as to increase gain by using a ground pattern, which is formed on a side surface of the third substrate S3 and a side surface of the dielectric package DP, as a reflector.

The dipole antenna corresponding to the first radiator R1 may include a first metal pattern MP1 and a second metal pattern MP2 which are spaced apart from each other by a predetermined slit gap SG. The first metal pattern MP1 and the second metal pattern MP2 may be formed in a metal pattern having a predetermined width and length and a feed pattern FP1 and FP2 perpendicular to the metal pattern. The feed pattern FP1 and FP2 may be formed so as to be connected to a feeding portion FP. In this regard, the dipole antenna corresponding to the first radiator R1 may be formed as a structural inductor so as to operate as a wideband antenna.

As described above, FIG. 5B shows the current distribution on the dipole antenna operating in different bands. Referring to FIG. 5B, the current distribution shows that current is concentrated at a portion corresponding to the structural inductor at 28 GHz which is a first band. Meanwhile, the current distribution shows that current is concentrated at a portion corresponding to the structural inductor at 38.5 GHz which is a second band. In this regard, the current distribution on the dipole antenna in the first band shows that a lower area has a higher current intensity than an upper area. On the other hand, the current distribution on the dipole antenna in the second band shows that the upper area as well as the lower area has a high current intensity.

As described above, FIG. 5C is a smith chart showing how the impedance of the dipole antenna changes with frequency. Referring to FIG. 5C, the impedance of the dipole antenna may be kept at around 50 ohm in a wide frequency band. In this regard, it can be found out that the impedance of the dipole antenna is distributed in a circle centered at 50 ohms on the smith chart.

Referring to FIGS. 5A to 5C, the configuration and electrical characteristics of the dipole antenna are as follows.

1) The dipole antenna is positioned on a side surface of the multi-layer substrate of the mmWave antenna module.

2) The ground wall surrounding the patch antenna is used to increase antenna directivity toward the side and improve antenna gain.

3) The radiator is used in the form of a structural inductor in order to ensure wideband operation characteristics.

4) The structural inductor generates an inductance at mmWave by having a thin line and causing a high current to flow therein.

5) In an embodiment, the structural inductor line has a width of 0.1 mm and a length of 0.5 mm.

6) It can be seen that a high current is concentrated in a structural inductor region at 28 GHz and 38.5 GHz. Accordingly, the impedance of the dipole antenna may be kept at around 50 ohm in a wide frequency band. In this regard, it can be found out that the impedance of the dipole antenna is distributed in a circle centered at 50 ohms on the smith chart.

The monopole antenna corresponding to the second radiator R2 may be formed by printing a metal pattern on the second substrate S2. The monopole antenna corresponding to the second radiator R2 may include a radiation portion RP and a first matching portion MP1. The monopole antenna corresponding to the second radiator R2 may further include a second matching portion MP2. A coupling structure including the first matching portion MP1 and the second matching portion MP2 may be referred to as a T-coupling structure. Also, the monopole antenna corresponding to the second radiator R2 may further include a feeding portion FP.

The radiation portion RP may be formed in a metal pattern having a predetermined width and length. The first matching portion MP1 may be connected to the radiation portion RP and formed in a metal pattern which is disposed on an end of the second substrate S2. The second matching portion MP2 may be formed in a metal pattern on an end of a side surface of the dielectric package DP attached to the first substrate S1. Accordingly, the second matching portion MP2 may be configured to be coupled to the first matching portion MP. In this regard, the first matching portion MP1 and the second matching portion MP2 may be spaced apart from each other by a predetermined gap G between the dielectric package DP and the second substrate S2. Meanwhile, the feeding portion FP may be connected to the second matching portion MP2 and configured to apply a signal to the radiation portion RP through the first matching portion MP1 and the second matching portion MP2.

The monopole antenna corresponding to the second radiator R2 may be formed by printing a metal pattern on the second substrate S2. A ground may be formed on the bottom of the second substrate S2, and the second substrate S2 and the dielectric package DP may be attached and fixed to a metal structure MS whose surface is made of metal. Meanwhile, the patch antenna corresponding to the third antenna R3 may be formed to be surrounded by a cavity CV which is formed to surround the bottom and side of the third substrate S3.

Referring to FIGS. 6A and 6B, the monopole antenna corresponding to the first radiator R2 is configured to have different current distributions in the first band and the second band. For example, in a first band corresponding to 28 GHz, the monopole antenna has a peak current along a boundary region of the radiation portion RP. In this regard, for the monopole antenna, one peak current path is formed by a first-order resonance, along the boundary region of the radiation portion RP.

For another example, in a second band corresponding to 38.5 GHz, the monopole antenna has a peak current along the boundary region of the radiation portion RP and the matching portions MP1 and MP2. In this regard, for the monopole antenna, another peak current path is formed by a second-order resonance, along a boundary region of the matching portions MP1 and MP2.

Referring to FIGS. 6A and 6B, the configuration and electrical characteristics of the monopole antenna are as follows.

1) The mmWave antenna module and the main PCB are separated from each other, and in this embodiment, there is a gap of 0.05 mm to 0.1 mm between them.

2) The monopole antenna is designed in a T-shape, like one line segment meeting another line segment in a direction perpendicular to the signal transmission direction, in order to transmit a mmWave signal to a separated radiator by coupling.

3) The length of a junction (coupling portion) of the T-shape in this embodiment may be set to 1.4 mm.

4) In the current distribution at the junction at 28 GHz, current flows in opposite directions, and energy from the feeding portion is transmitted as a signal to the radiator in the main PCB. Thus, the main radiator positioned over the main PCB operates to radiate an electric wave.

5) The current generated from the junction at 38.5 GHz flows in different directions, and has high intensity in the two areas and acts as a secondary resonance. Accordingly, the radiator positioned over the main PCB and the T-coupling line operate together as a radiator and radiate an electric wave.

Figure 7A:
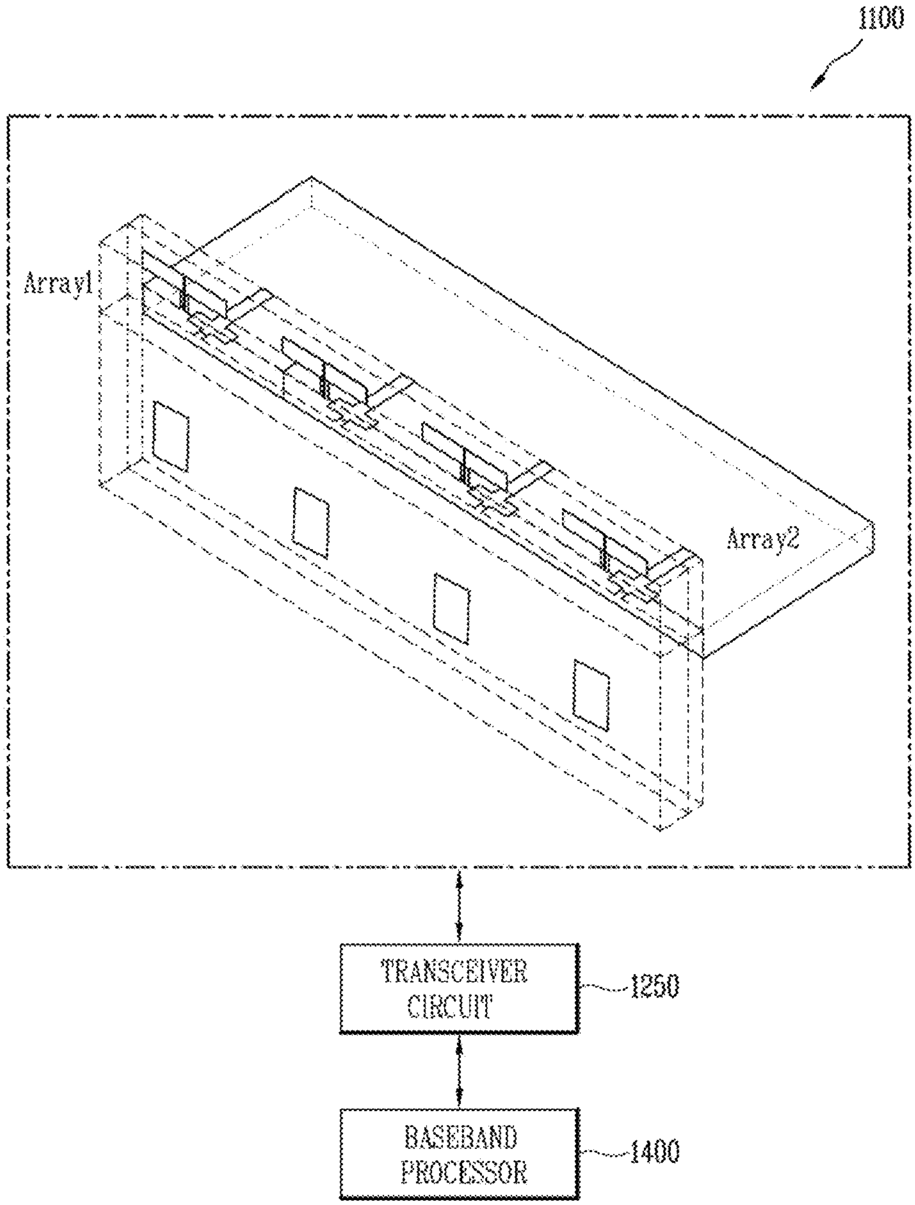
FIG. 7A shows a perspective view of an antenna module in which a plurality of antennas is configured as an array antenna. Meanwhile.
Figure 7B:
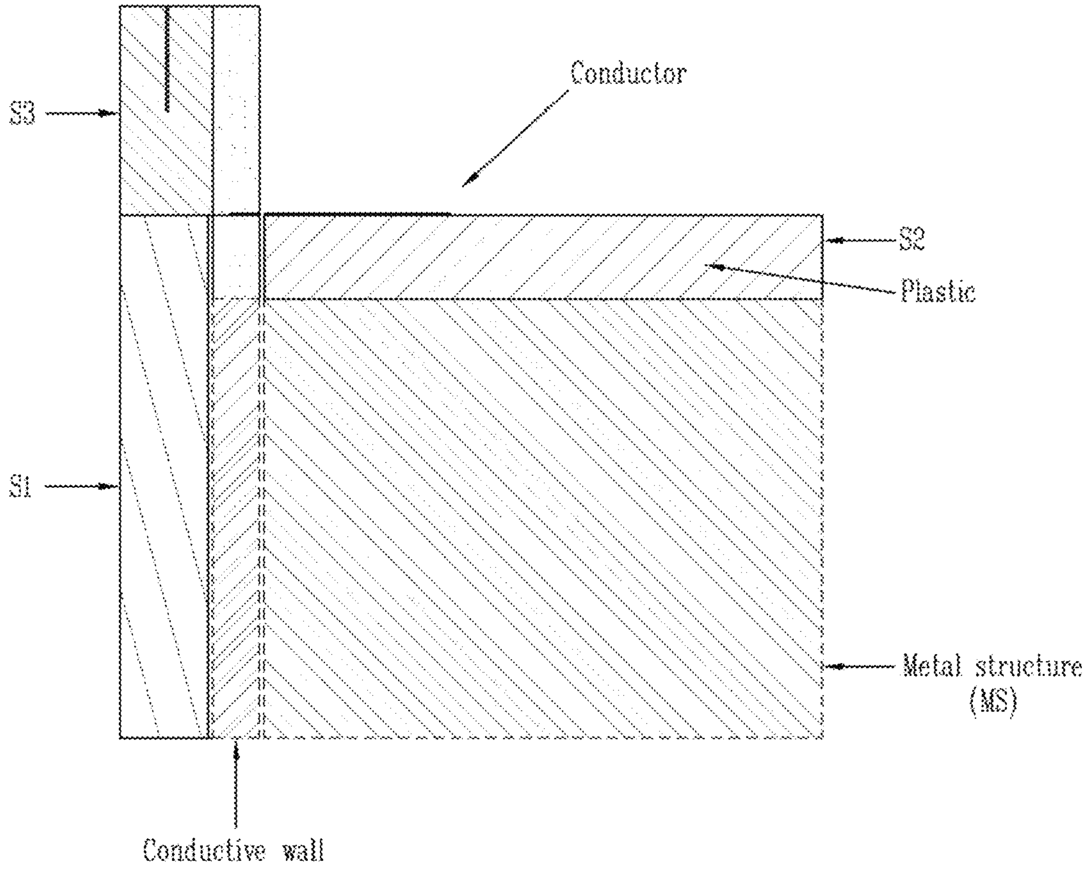
FIG. 7B shows a side view of the antenna module of FIG. 7A.
Figure 8A:
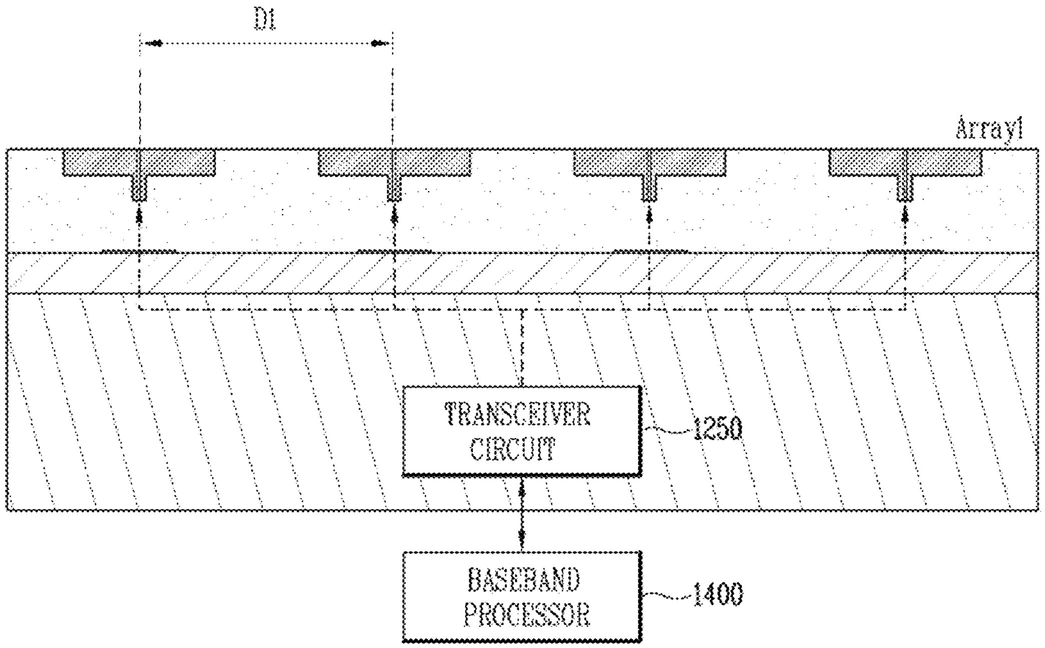
FIG. 8A shows an array antenna with a plurality of monopole antenna elements and a configuration for controlling the same. Meanwhile.
Figure 8B:
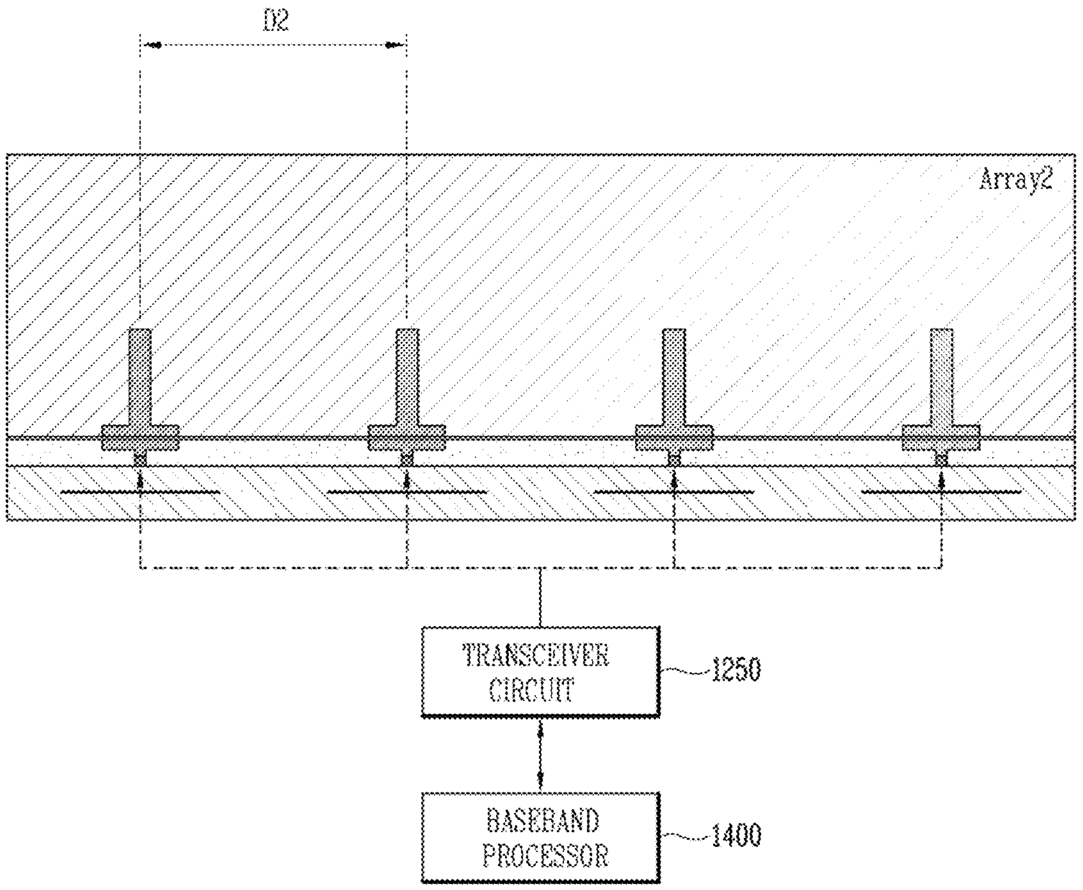
FIG. 8B shows an array antenna with a plurality of dipole antenna elements and a configuration for controlling the same.

Meanwhile, the plurality of radiators R1 to R3 described in this specification may be configured as an array antenna. In this regard, FIG. 7A shows a perspective view of an antenna module in which a plurality of antennas is configured as an array antenna. Meanwhile, FIG. 7B shows a side view of the antenna module of FIG. 7A. In this regard, FIG. 8A shows an array antenna with a plurality of monopole antenna elements and a configuration for controlling the same. Meanwhile, FIG. 8B shows an array antenna with a plurality of dipole antenna elements and a configuration for controlling the same.

Referring to FIGS. 7A to 8B, for a dipole antenna, a plurality of dipole antenna elements spaced at predetermined intervals may be formed as a first array antenna ARRAY1. Meanwhile, for a monopole antenna, a plurality of monopole antenna elements spaced at predetermined intervals may be formed as a second array antenna ARRAY2. Also, the patch antenna corresponding to the third radiator R3 may be formed to be surrounded by a cavity (CV) which is formed to surround the bottom and side of the third substrate S3. For the patch antenna corresponding to the third radiator R3, a plurality of antenna elements may be formed as a third array antenna ARRAY3 so as to operate as an antenna in a mmWave band.

The first array antenna ARRAY1 may include a plurality of first radiators R1, for example, a plurality of dipole antennas. For example, the first array antenna ARRAY1 may include four dipole antennas, but are not limited thereto and may vary depending on applications. The distance between the dipole antennas within the first array antenna ARRAY1 may be set to D1. For example, the distance between the dipole antennas within the first array antenna ARRAY1 may be set to approximately a half wavelength, but is not limited thereto and may vary depending on applications. In this regard, the distance between the dipole antennas within the first array antenna ARRAY1 may be set to around 5 mm, but is not limited thereto and may vary depending on applications.

The second array antenna ARRAY2 may include a plurality of second radiators R2, for example, a plurality of monopole antennas. For example, the second array antenna ARRAY2 may include four monopole antennas, but are not limited thereto and may vary depending on applications. The distance between the monopole antennas within the second array antenna ARRAY2 may be set to D2. For example, the distance between the monopole antennas within the second array antenna ARRAY2 may be set to approximately a half wavelength, but is not limited thereto and may vary depending on applications. In this regard, the distance between the monopole antennas within the second array antenna ARRAY2 may be set to around 5 mm, but is not limited thereto and may vary depending on applications.

The baseband processor 1400 may control the transceiver circuit 1250 so as to radiate a signal through the first array antenna ARRAY1 and the second array antenna ARRAY2. Specifically, the baseband processor 1400 may control the transceiver circuit 1250 so as to radiate a horizontal polarization (HP) signal through the first array antenna ARRAY1. Also, the baseband processor 1400 may control the transceiver circuit 1250 so as to radiate a vertical polarization (HP) signal through the second array antenna ARRAY2.

The first array antenna ARRAY1 and the second array antenna ARRAY2 are not limited to forming a horizontal polarization (HP) signal and a vertical polarization (VP) signal, respectively. In this regard, different polarization signals may be formed depending on the configuration of how the antenna module 1100 provided with different array antennas is disposed. Accordingly, the first array antenna ARRAY1 may form a vertical polarization (VP) signal, and the second array antenna ARRAY2 may form a horizontal polarization (HP) signal.

The monopole antenna corresponding to the second radiator R2 may be formed by printing a metal pattern on the second substrate S2. Referring to FIG. 7B, a ground may be formed on the bottom of the second substrate S2, and the second substrate S2 and the dielectric package DP may be attached and fixed to a metal structure MS whose surface is made of metal.

Referring to FIGS. 7A to 8B, array antennas are configured as follows.

1) Array antennas are arranged at intervals of about half the wavelength of the center frequency of a low band of mmWave operating frequencies.

2) In this embodiment, the center frequency is 28 GHz and 38.5 GHz, and the antennas are arranged at 5 mm intervals since the wavelength of 28 GHz corresponding to the low band divided by two equals 5 mm.

3) The dipole antennas in the mmWave antenna module are arranged at 5 mm intervals.

4) The monopole antennas positioned over the main PCB are also arranged at 5 mm intervals.

The baseband processor 1400 may be configured to perform multiple input multiple output (MIMO). In this regard, the baseband processor 1400 may perform MIMO by radiating a horizontal polarization signal through the first array antenna ARRAY1 and radiating a vertical polarization signal through the second array antenna ARRAY2. Accordingly, MIMO may be performed through antennas having different polarizations in the same band, i.e., the first band or the second band.

The baseband processor 1400 may switch between single input single output (SISO) and multiple input multiple output (MIMO). In this regard, the baseband processor 1400 may determine whether the quality of a first signal, which is a horizontal polarization signal, and the quality of a second signal, which is a vertical polarization signal, are lower than or equal to a threshold. If both of the quality of the first signal and the quality of the second signal are lower than or equal to the threshold, the baseband processor 1300 may switch to the third array antenna ARRAY3. The baseband processor 1400 may control the transceiver circuit 1250 so as to radiate a third signal in the direction of the front of the third substrate through the third array antenna ARRAY3.

The baseband processor 1400 may perform SISO by using one of the antennas used for MIMO. In this regard, the baseband processor 1400 may determine whether the quality of the first signal, which is a beamformed horizontal polarization signal received through the first array antenna ARRAY1, is lower than or equal to a threshold. If the quality of the first signal is lower than or equal to the threshold, the baseband processor 1400 may receive the second signal, which is a vertical polarization signal, by performing beamforming through the second array antenna ARRAY2.

Meanwhile, the baseband processor 1400 may determine whether the quality of the second signal, which is a beamformed vertical polarization signal received through the second array antenna ARRAY2, is lower than or equal to a threshold. If the quality of the second signal is lower than or equal to the threshold, the baseband processor 1400 may receive the first signal, which is a horizontal polarization signal, by performing beamforming through the first array antenna ARRAY1.

The baseband processor 1400 may control to perform communication with a base station through a band with good propagation characteristics, among different bands. In this regard, in the first band, the baseband processor 1400 may control to radiate the first signal, which is a horizontal polarization signal, through the first array antenna ARRAY1 and to radiate the second signal, which is a vertical polarization signal, through the second array antenna ARRAY2.

If the quality of the first signal and the quality of the second signal are lower than or equal to a threshold, the baseband processor 1400 may send the base station a request for resources of the second band which is a higher frequency band than the first band. Accordingly, the base station may allocate the resources of the second band to the corresponding electronic device. Consequently, in the second band, the baseband processor 1400 may control to radiate a horizontal polarization signal through the first array antenna ARRAY1 and to radiate a vertical polarization signal through the second array antenna ARRAY2. Specifically, the baseband processor 1400 may determine which time slots and which frequency resources of the second band are allocated by performing blind decoding of PDCCH. For the corresponding time and frequency resources, the baseband processor 1400 may control to radiate a horizontal polarization signal through the first array antenna ARRAY1 and to radiate a vertical polarization signal through the second array antenna ARRAY2.

In the above, an electronic device provided with a plurality of antennas operating in different mmWave bands according to an aspect of this specification has been described. Hereinafter, an antenna module provided in an electronic device and having a plurality of antennas operating in different mmWave bands will be described.

Figure 9:
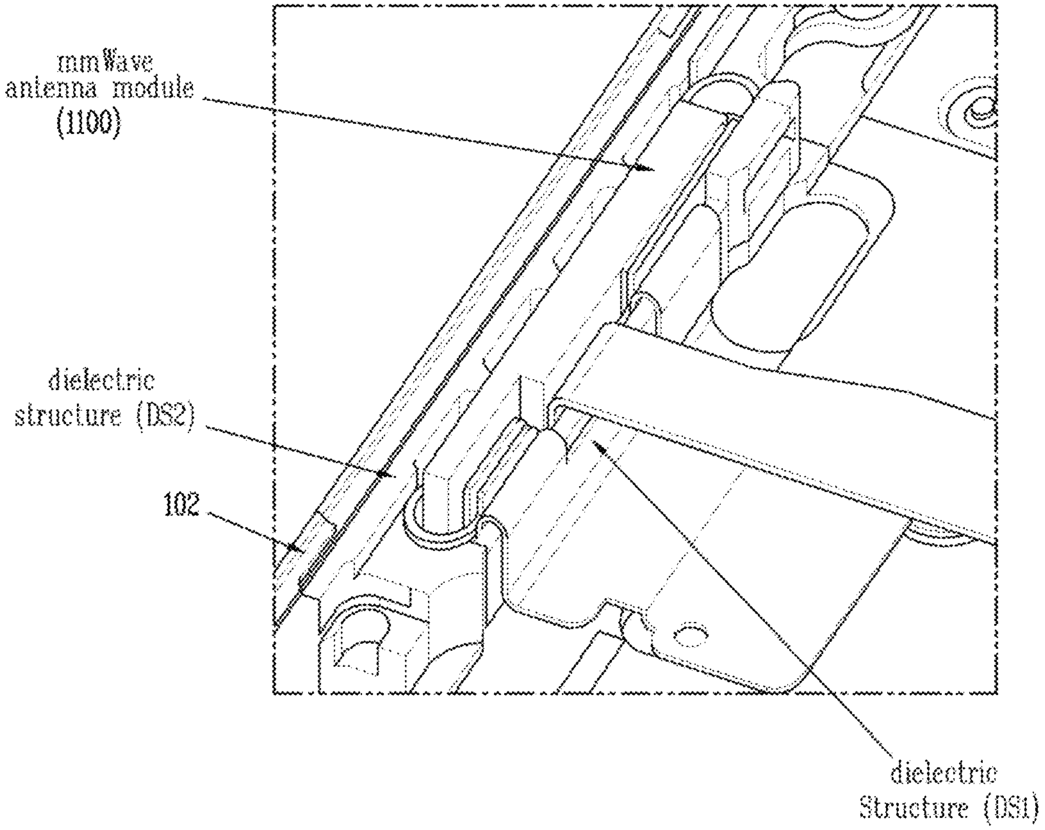
FIG. 9 shows an electronic device provided with a mmWave antenna module according to an embodiment.

In this regard, FIG. 9 shows an electronic device provided with a mmWave antenna module according to an embodiment. Referring to FIG. 9, the antenna module 1100 may be disposed within the electronic device. Meanwhile, one or more dielectric structures DS1 and DS2 may be disposed around the antenna module 1100 so that an electric wave is radiated from the plurality of antennas disposed in the antenna module 1100.

In relation to an antenna module provided in an electronic device and having a plurality of antennas operating in different mmWave bands, the following description will be given with reference to FIGS. 1 to 9.

1) The mmWave antenna module may be fixed by a plastic instrument, i.e., a dielectric structure.

2) A conductor is disposed on a plastic instrument, i.e., a dielectric structure, and used as a monopole antenna radiator.

3) A conductor is disposed under a plastic instrument and used as a reflector for a monopole antenna.

4) A metal for fixing the mmWave antenna module is a radiator from an antenna's point of view but serves to dissipate heat in a mechanical sense.

5) A metal for fixing the mmWave antenna module touches a conductive wall surrounding a mmWave antenna module package.

6) Heat generated from the mmWave antenna module is dispersed through the metal, thereby providing a heat dissipation effect.

The second array antenna ARRAY2 corresponding to the second substrate S2, where the second radiator R2 is arranged, may be disposed on the first dielectric structure DS1. The second dielectric structure DS2 may be disposed on the front of the mmWave antenna module 1100. The second dielectric structure DS2 may be disposed in an aperture formed in the side case 102, so that a signal radiated from the mmWave antenna module 1100 may be propagated out of the electronic device.

Referring to FIGS. 1 to 9, the antenna module 1100 may include a plurality of antennas R1 and R2. In this regard, the antenna module 1100 may include a dipole antenna corresponding to the first radiator R1 and a monopole antenna corresponding to the second radiator R2. Meanwhile, the antenna module 1100 may further include a dielectric package DP. Also, the antenna module 1100 may further include a patch antenna corresponding to the third radiator R3.

The dipole antenna corresponding to the first radiator R1 may be disposed inside the first substrate S1 and configured to radiate a first signal having a first polarization in the direction of a side surface of the first substrate S1. The monopole antenna corresponding to the second radiator R2 may be disposed on the second substrate S2 which is disposed perpendicular to the first substrate S1. The monopole antenna may be configured to radiate a second signal having a second polarization perpendicular to the first polarization, in the direction of the side surface of the first substrate S1. The dielectric package DP may be disposed on the rear of the first substrate S1 and formed to surround an RFIC 1250 which is operatively coupled to the monopole antenna and the dipole antenna.

The first substrate S1 may be configured as a multi-layer substrate, and the dipole antenna may be formed by printing a metal pattern on a layer inside the first substrate S1 corresponding to the multi-layer substrate. The monopole antenna may be formed by printing a metal pattern on the second substrate S2.

The third radiator R3 may be configured as a patch antenna. The patch antenna corresponding to the third radiator R3 may be disposed on the front of the third substrate S3 disposed on the bottom of the first substrate S1 and configured to radiate a third signal in the direction of the front of the third substrate S3. Meanwhile, the patch antenna corresponding to the third radiator R3 may operate as an antenna having a first polarization and a second polarization through dual feeding. For example, the patch antenna corresponding to the third radiator R3 may operate as a vertical polarization antenna and a horizontal antenna.

For example, the patch antenna corresponding to the third radiator R3 may operate as a vertical polarized antenna and a horizontal antenna. Accordingly, signals having polarizations orthogonal to each other may be simultaneously transmitted and/or received in the direction of the side surface of the first substrate S1 through the first radiator R1 and the second radiator R2. Also, signals having polarizations orthogonal to each other may be simultaneously transmitted and/or received in the direction of the side surface of the first substrate S1 through a dual feeding structure of the patch antenna corresponding to the third radiator R3. Consequently, dual polarization may be implemented through at least one antenna within the antenna module 1100 through different antennas in any direction.

The dipole antenna corresponding to the first radiator R1 may be disposed perpendicular to the monopole antenna disposed on the second substrate S2. Also, the dipole antenna corresponding to the first radiator R1 may be formed in such a way as to increase gain by using a ground pattern, which is formed on a side surface of the third substrate S3 and a side surface of the dielectric package DP, as a reflector.

The monopole antenna corresponding to the second radiator R2 may include a radiation portion RP formed in a metal pattern having a predetermined width and length. The monopole antenna may further include a first matching portion MP1 which is connected to the radiation portion RP and formed in a metal pattern on an end of the second substrate S2. The monopole antenna may further include a second matching portion MP2 which is formed in a metal pattern on an end of a side surface of the dielectric package DP attached to the first substrate S1 and is configured to be coupled to the first matching portion MP1. The monopole antenna may further include a feeding portion which is connected to the second matching portion MP2 and configured to apply a signal to the radiation portion RP through the first matching portion MP1 and the second matching portion MP2. Meanwhile, the first matching portion MP1 and the second matching portion MP2 may be spaced apart from each other by a predetermined gap between the dielectric package DP and the second substrate S2.

Figure 10A:
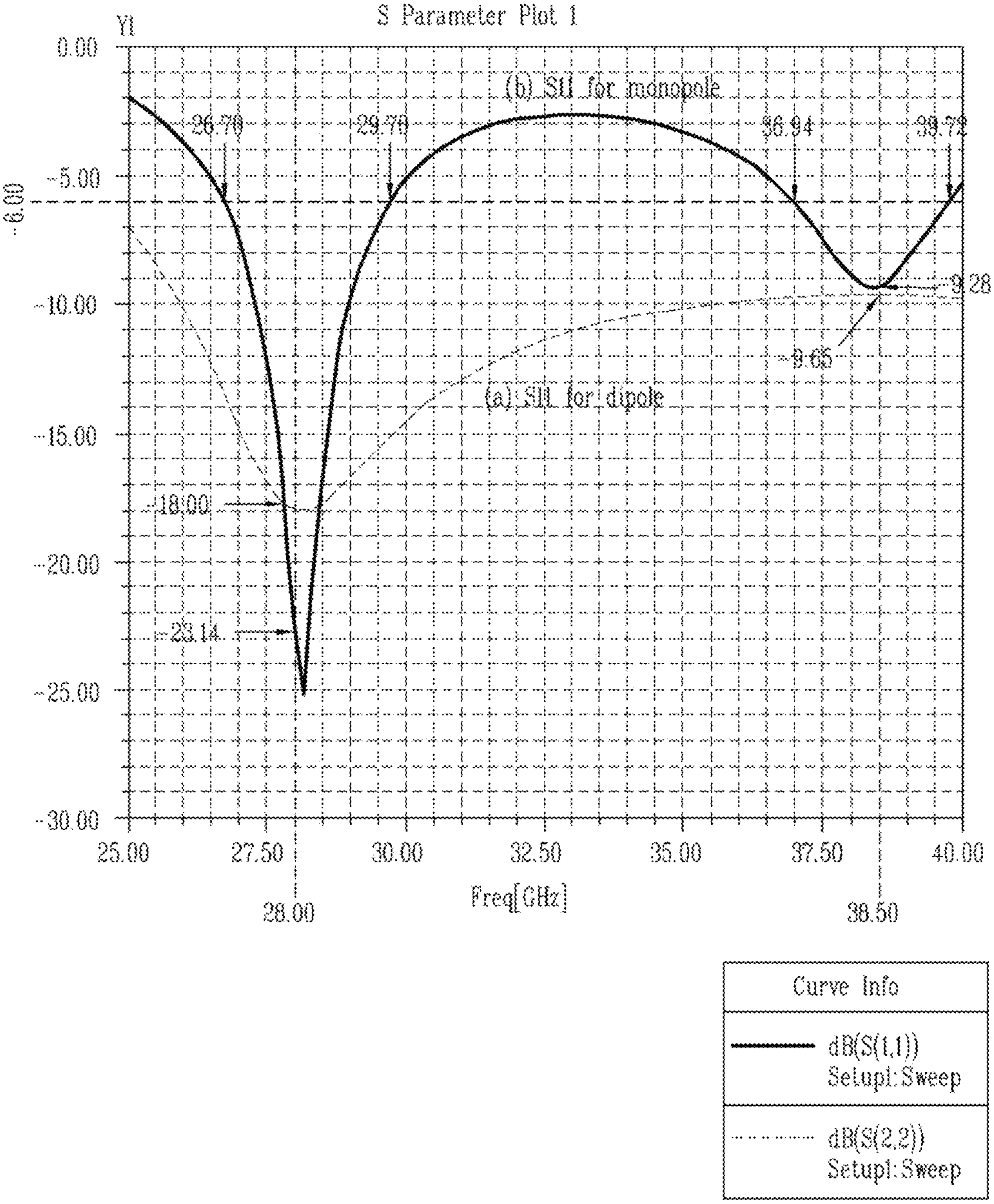
FIG. 10A shows reflection coefficient characteristics of a monopole antenna and a dipole antenna. Meanwhile.

In the above, an electronic device provided with an antenna module according to this specification and an antenna module that may be disposed in the electronic device have been described in detail. Hereinafter, electrical characteristics of a plurality of antennas within the above-described antenna module will be described. In this regard, FIG. 10A shows reflection coefficient characteristics of a monopole antenna and a dipole antenna. Meanwhile, FIG. 10B shows isolation characteristics of a monopole antenna and a dipole antenna.

Referring to FIGS. 4A, 4B, and 10A, the dipole antenna corresponding to the first radiator R1 has reflection coefficient characteristics of −9 dB or less in a first band including 28 GHz and a second band including 38.5 GHz. In this regard, the dipole antenna corresponding to the first radiator R1 has wideband characteristics which allows it to operate in all bands. Accordingly, the dipole antenna operates in a wide band of 25 to 40 GHz with respect to S11 of −6 dB.

Meanwhile, the monopole antenna corresponding to the second radiator R2 has reflection coefficient characteristics of −6 dB or less in the first band and the second band. In this regard, the monopole antenna corresponding to the second radiator R2 has dual resonance characteristics in the first band and the second band. Accordingly, the monopole antenna operates at 26.7 to 29.7 GHz and at 36.9 to 39.7 GHz with respect to S11 of −6 dB.

Figure 10B:
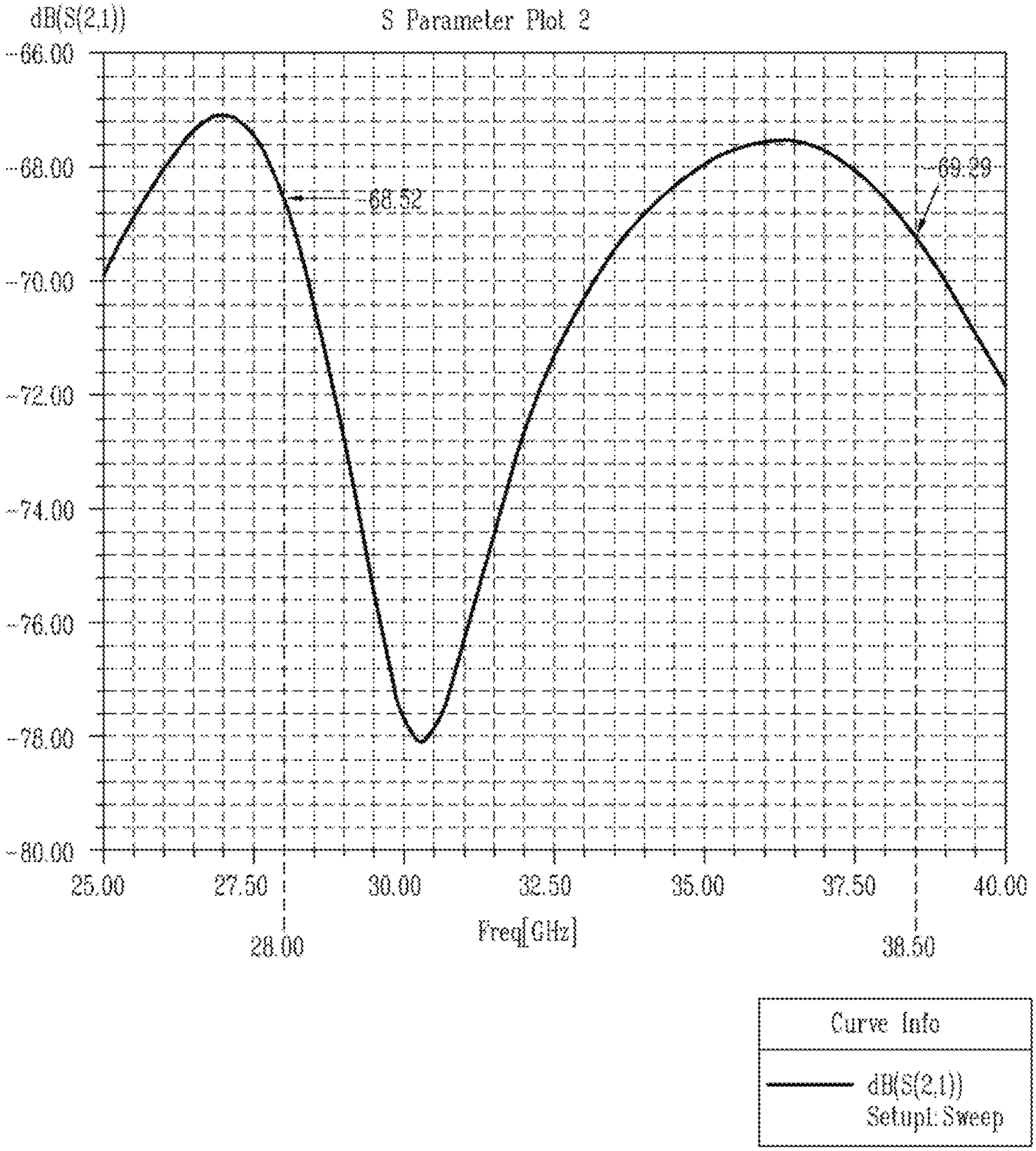
FIG. 10B shows isolation characteristics of a monopole antenna and a dipole antenna.

Referring to FIG. 4A, FIG. 4B, and FIG. 10B, the dipole antenna corresponding to the first radiator R1 and the monopole antenna corresponding to the second radiator R2 may have isolation characteristics of −60 dB or less in all bands. In this regard, antenna-to-antenna isolation having a vertical/horizontal polarization in mmWave is important, and the lower S21, the higher the isolation. S21 between the dipole antenna operating as a horizontal polarization and the monopole antenna operating as a vertical polarization has a value of −66 dB or less, which is a very high isolation characteristic.

The dipole antenna corresponding to the first radiator R1 and the monopole antenna corresponding to the second radiator R2 radiate a signal in the direction of a side surface of the first substrate S1 (i.e., in the direction of the front of the second substrate S2). In this regard, FIG. 11 shows polarization and gain characteristics at different frequencies of array antennas implemented as a dipole antenna and a monopole antenna according to this specification.

Figures 11, 12:
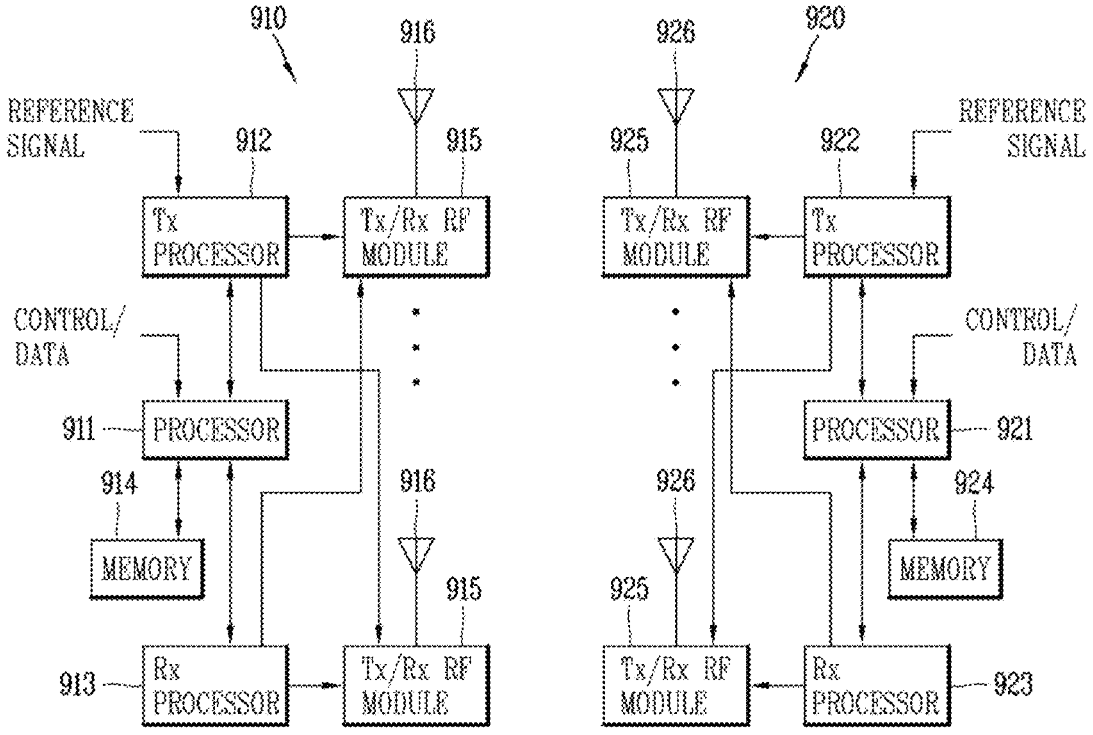
FIG. 11 shows polarization and gain characteristics at different frequencies of array antennas implemented as a dipole antenna and a monopole antenna according to this specification.
FIG. 12 illustrates a block diagram of a wireless communication system to which methods proposed in this specification may be applied.

Referring to FIG. 7A and FIG. 11, the first array antenna ARRAY1 including a dipole antenna corresponding to the first radiator R1 operates as a horizontal polarization HP. The first array antenna ARRAY1 has a gain value of 11.5 dBi at 28 GHz and a gain value of 10.1 dBi at 38.5 GHz. Here, the first array antenna ARRAY1 has four antenna elements, and the distance between the elements is 5 mm. These gain values are higher than 9 dBi (@28 gHz) and 10 dBi (@28 GHz) which are gain values of array antennas including typical patch antennas.

Meanwhile, the second array antenna ARRAY2 including a monopole antenna corresponding to the second radiator R2 operates as a vertical polarization VP. The second array antenna ARRAY2 has a gain value of 9.0 dBi at 28 GHz and a gain value of 8.0 dBi at 38.5 GHz.

It will be understood by those skilled in the art that various changes and modifications to the above-described embodiments related to an antenna module provide with a plurality of antennas and a configuration for controlling the same may be made without departing from the spirt and scope of the present disclosure. Therefore, it should be understood that various changes and modifications to the embodiments fall within the scope of the appended claims.

In the above, an electronic device provided with an antenna module having a plurality of antennas according to the present disclosure has been described. A wireless communication system including a base station and such an electronic device, which is provided with an antenna module having a plurality of antennas, will be described below. In this regard, FIG. 12 illustrates a block diagram of a wireless communication system to which methods proposed in this specification may be applied.

Referring to FIG. 12, the wireless communication system includes a first communication device 910 and/or a second communication device 920. The phrases "A and/or B" and "at least one of A or B" are may be interpreted as the same meaning. The first communication device 910 may be a base station, and the second communication device 920 may be a terminal (or the first communication device 910 may be a terminal or a vehicle, and the second communication device 920 may be a base station).

The term "base station (BS)" may be replaced with fixed station, Node B, evolved Node B (eNB), base transceiver system (BTS), access point (AP), next generation Node B (gNB), 5G system, network, AI system, road side unit (RSU), robot, and so on. The term "terminal" may be stationary or mobile and be replaced with user equipment (UE), mobile station (MS), user terminal (UT), mobile subscriber station (MSS), subscriber station (SS), advanced mobile station (AMS), wireless terminal (WT), machine-type communication (MTC) device, machine-to-machine (M2m) device, device-to-device (D2) device, vehicle, robot, AI module, and so on.

The first communication device and the second communication device include processors 911 and 921, memories 914 and 924, one or more Tx/Rx radio frequency (RF) modules 915 and 925, Tx processors 912 and 922, Rx processors 913 and 923, and antennas 916 and 926. The processor implements a function, a process, and/or a method which are described above. More specifically, a higher layer packet from a core network is provided to the processor 911 in DL (communication from the first communication device to the second communication device). The processor implements a function of an L2 layer. In the DL, the processor provides multiplexing between a logical channel and a transmission channel and allocation of radio resources to the second communication device 920 and takes charge of signaling to the second communication device. The transmit (TX) processor 912 implement various signal processing functions for an L1 layer (i.e., physical layer). The signal processing functions facilitate forward error correction (FEC) at the second communication device and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 916 via individual Tx/Rx modules (or transceivers, 915). Each Tx/Rx module may modulate an RF carrier into each spatial stream for transmission. In the second communication device, each Tx/Rx module (or transceiver, 925) receives a signal through each antenna 926 of each Tx/Rx module. Each Tx/Rx module reconstructs information modulated with the RF carrier and provides the reconstructed information to the receive (RX) processor 923. The RX processor implements various signal processing functions of layer 1. The RX processor may perform spatial processing on information in order to reconstruct an arbitrary spatial stream which is directed for the second communication device. When multiple spatial streams are directed to the second communication device, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the first communication device. The soft decisions may be based on channel estimation values. The soft decisions are decoded and deinterleaved to reconstruct data and control signals originally transmitted by the first communication device on the physical channel. The corresponding data and control signals are provided to the processor 921.

UL (communication from the second communication device to the first communication device) is processed by the first communication device 910 in a scheme similar to a description of a receiver function in the second communication device 920. Each Tx/Rx module 925 receives the signal through each antenna 926. Each Tx/Rx module provides the RF carrier and information to the RX processor 923. The processor 921 may be associated with the memory 924 storing a program code and data. The memory may be referred to as a computer readable medium.

In the above, an antenna module provided with a plurality of antennas operating in a millimeter-wave band and an electronic device for controlling the same have been described. Technical advantages of such an antenna module provided with a plurality of antennas operating in a millimeter-wave band and an electronic device for controlling the same will be described as follows.

According to an embodiment, there is provided an electronic device comprising an antenna module with a plurality of antennas operating in a millimeter-wave band and a configuration for controlling the same.

According to an embodiment, it is possible to dispose a package module in an electronic device, the package module including a millimeter wave band antenna module and a circuit, without increasing the size and mounting space of the package module.

According to an embodiment, it is possible to provide side radiation using dipole/monopole antennas implemented on substrates that are disposed perpendicular to each other, in order to increase the coverage of a mmWave antenna.

According to an embodiment, it is possible to support multiple input multiple output (MIMO) by implementing dual polarization while using dipole/monopole antennas for wideband operation in a mmWave band.

According to an embodiment, it is possible to support multiple input multiple output (MIMO) by implementing dual polarization while using dipole/monopole antennas for wideband operation in a mmWave band.

According to an embodiment, it is possible to provide a new, optimal feeding scheme that allows for separation while implementing dual polarization in a mmWave band.

According to an embodiment, it is possible to improve isolation when implementing dual polarization, by a new optimal feeding scheme that allows for separation while implementing dual polarization in a mmWave band.

According to an embodiment, it is possible to improve performance in a multiple input multiple output (MIMO) operation by improving isolation when implementing dual polarization.

According to an embodiment, it is possible to implement dual polarization in an antenna, without increasing parts costs, only by using peripherals of an antenna module disposed in an electronic device.

Further scope of applicability of the present disclosure will become apparent from the following detailed description. It should be understood, however, that the detailed description and specific examples, such as the preferred implementation of the disclosure, are given by way of illustration only, since various changes and modifications within the spirit and scope of the disclosure will be apparent to those skilled in the art.

Meanwhile, the control of the antenna module having the plurality of antennas operating in the millimeter wave band and the electronic device controlling the same can be implemented as computer-readable codes in a medium in which a program is recorded. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device comprising:

a first radiator disposed inside a first substrate, and configured as a dipole antenna that is configured to radiate a first signal in the direction of a side surface of the first substrate, the first signal having a first polarization;

a second radiator disposed on a second substrate which is disposed perpendicular to the first substrate, and configured as a monopole antenna configured to radiate a second signal in the direction of the side surface of the first substrate, the second signal having a second polarization perpendicular to the first polarization;

a transceiver circuit disposed on a rear of the first substrate, and configured to transmit or receive at least one of the first signal or the second signal through at least one of the first radiator or the second radiator; and a baseband processor operatively coupled to the transceiver circuit and configured to control the transceiver circuit, wherein the monopole antenna includes:

a radiator formed in a metal pattern having a predetermined width and length;

a first matching portion connected to the radiator and formed in a metal pattern on an end of the second substrate;

a second matching portion formed in a metal pattern on an end of a side surface of a dielectric package attached to the first substrate; and a feeding portion connected to the second matching portion and configured to apply a signal to the radiator through the first matching portion and the second matching portion, wherein the first matching portion and the second matching portion are spaced apart from each other by a predetermined gap between the dielectric package and the second substrate, wherein the dipole antenna is formed as a first array antenna including a plurality of dipole antenna elements spaced at predetermined intervals, wherein the monopole antenna is formed as a second array antenna including a plurality of monopole antenna elements spaced at predetermined intervals, wherein the baseband processor controls the transceiver circuit so as to radiate a horizontal polarization signal through the first array antenna and to radiate a vertical polarization signal through the second array antenna.

2. The electronic device of claim 1, wherein the first substrate includes a multi-layer substrate, the dipole antenna is formed by printing a metal pattern on one layer inside the first substrate corresponding to the multi-layer substrate, and the monopole antenna is formed by printing a metal pattern on the second substrate.

3. The electronic device of claim 1, further comprising a third radiator disposed on the front of the third substrate disposed on the rear of the first substrate, and configured to radiate a third signal in the direction of the front of the third substrate, wherein the third radiator includes a patch antenna.

4. The electronic device of claim 3, wherein the transceiver circuit includes a radio frequency integrated circuit (RFIC), the RFIC being surrounded by a dielectric package, and an antenna module including the third substrate and the dielectric package is spaced apart from a main printed circuit board (PCB) corresponding to the second substrate by a predetermined gap.

5. The electronic device of claim 4, wherein the monopole antenna is formed by printing a metal pattern on the second substrate, and a ground is formed on the bottom of the second substrate, and the second substrate and the dielectric package are attached and fixed to a metal structure whose surface is made of metal.

6. The electronic device of claim 3, wherein the dipole antenna is disposed perpendicular to the monopole antenna disposed on the second substrate, and is formed in such a way as to increase gain by using a ground pattern, which is formed on a side surface of the third substrate and a side surface of the dielectric package, as a reflector.

7. The electronic device of claim 3, wherein the patch antenna is formed to be surrounded by a cavity which is formed to surround the bottom and side of the third substrate, and, for the patch antenna, a plurality of antenna elements is formed as a third array antenna so as to operate as an antenna in a millimeter wave (mmWave) band.

8. The electronic device of claim 7, wherein the baseband processor performs multiple input multiple output (MIMO) by radiating a horizontal polarization signal through the first array antenna and radiating a vertical polarization signal through the second array antenna, wherein, if the quality of a first signal corresponding to the horizontal polarization signal and the quality of a second signal corresponding to the vertical polarization signal are lower than or equal to a threshold, the baseband processor controls the transceiver circuit so as to radiate a third signal through the third array antenna in the direction of the front of the third substrate.

9. The electronic device of claim 1, wherein, if the quality of the first signal, which is a beamformed horizontal polarization signal received through the first array antenna, is lower than or equal to a threshold, the baseband processor receives the second signal, which is a vertical polarization signal, by performing beamforming through the second array antenna.

10. The electronic device of claim 1, wherein, in a first band, the baseband processor controls to radiate the first signal, which is a horizontal polarization signal, through the first array antenna and to radiate the second signal, which is a vertical polarization signal, through the second array antenna, if the quality of the first signal and the quality of the second signal are lower than or equal to a threshold, the baseband processor sends the base station a request for resources of the second band which is a higher frequency band than the first band, and in a second band, the baseband processor controls to radiate a horizontal polarization signal through the first array antenna and to radiate a vertical polarization signal through the second array antenna.

11. An antenna module provided in an electronic device, the antenna module comprising:

a monopole antenna disposed inside a first substrate, and configured to radiate a first signal in the direction of a side surface of the first substrate, the first signal having a first polarization;

a dipole antenna disposed on a second substrate which is disposed perpendicular to the first substrate, and configured to radiate a second signal in the direction of the side surface of the first substrate, the second signal having a second polarization perpendicular to the first polarization;

a dielectric package disposed on a rear of the first substrate, and formed to surround a radio frequency integrated circuit (RFIC) operatively coupled to the monopole antenna and the dipole antenna; and a baseband processor operatively coupled to the RFIC and configured to control the RFIC, wherein the monopole antenna includes:

a radiator formed in a metal pattern having a predetermined width and length;

a first matching portion connected to the radiator and formed in a metal pattern on an end of the second substrate;

a second matching portion formed in a metal pattern on an end of a side surface of the dielectric package attached to the first substrate; and a feeding portion connected to the second matching portion and configured to apply a signal to the radiator through the first matching portion and the second matching portion, wherein the first matching portion and the second matching portion are spaced apart from each other by a predetermined gap between the dielectric package and the second substrate, wherein the dipole antenna is formed as a first array antenna including a plurality of dipole antenna elements spaced at predetermined intervals, wherein the monopole antenna is formed as a second array antenna including a plurality of monopole antenna elements spaced at predetermined intervals, wherein the baseband processor controls the RFIC so as to radiate a horizontal polarization signal through the first array antenna and to radiate a vertical polarization signal through the second array antenna.

12. The antenna module of claim 11, wherein the first substrate includes a multi-layer substrate, the dipole antenna is formed by printing a metal pattern on one layer inside the first substrate corresponding to the multi-layer substrate, and the monopole antenna is formed by printing a metal pattern on the second substrate.

13. The antenna module of claim 11, further comprising a third radiator disposed on the front of the third substrate disposed on the bottom of the first substrate, and configured to radiate a third signal in the direction of the front of the third substrate, wherein the third radiator includes a patch antenna.

* * * * *